United States Patent
Kim et al.

(10) Patent No.: US 12,200,526 B2
(45) Date of Patent: Jan. 14, 2025

(54) METHOD AND APPARATUS FOR PERFORMING CELL RESELECTION IN NEXT-GENERATION MOBILE COMMUNICATION SYSTEM OPERATING IN UNLICENSED FREQUENCY BAND

(71) Applicant: Samsung Electronics Co., Ltd., Suwon-si (KR)

(72) Inventors: Sangbum Kim, Suwon-si (KR); Soenghun Kim, Suwon-si (KR)

(73) Assignee: Samsung Electronics Co., Ltd., Suwon-si (KR)

( * ) Notice: Subject to any disclaimer, the term of this patent is extended or adjusted under 35 U.S.C. 154(b) by 588 days.

(21) Appl. No.: 17/283,146

(22) PCT Filed: Oct. 29, 2019

(86) PCT No.: PCT/KR2019/014386
§ 371 (c)(1),
(2) Date: Apr. 6, 2021

(87) PCT Pub. No.: WO2020/091389
PCT Pub. Date: May 7, 2020

(65) Prior Publication Data
US 2021/0392534 A1   Dec. 16, 2021

(30) Foreign Application Priority Data
Oct. 29, 2018 (KR) .................. 10-2018-0130022

(51) Int. Cl.
*H04W 24/10* (2009.01)
*H04W 16/14* (2009.01)
(Continued)

(52) U.S. Cl.
CPC .......... *H04W 24/10* (2013.01); *H04W 16/14* (2013.01); *H04W 74/0808* (2013.01);
(Continued)

(58) Field of Classification Search
None
See application file for complete search history.

(56) References Cited

U.S. PATENT DOCUMENTS

| | | |
|---|---|---|
| 8,577,375 B2 | 11/2013 | Lee et al. |
| 10,349,392 B2 | 7/2019 | Oh et al. |
| (Continued) | | |

FOREIGN PATENT DOCUMENTS

| | | |
|---|---|---|
| CN | 107925494 A | 4/2018 |
| CN | 108702795 A | 10/2018 |
| (Continued) | | |

OTHER PUBLICATIONS

Qualcomm Incorporated, 'RACH report enhancements for Son', R2-1814107, 3GPP TSG-RAN WG2 Meeting #103bis, Sep. 28, 2018.
(Continued)

*Primary Examiner* — Nicholas Sloms
(74) *Attorney, Agent, or Firm* — Jefferson IP Law, LLP

(57) ABSTRACT

The present disclosure relates to a communication method and system for converging a $5^{th}$-Generation (5G) communication system for supporting higher data rates beyond a $4^{th}$-Generation (4G) system with a technology for Internet of Things (IoT). The present disclosure may be applied to intelligent services based on the 5G communication technology and the IoT-related technology, such as smart home, smart building, smart city, smart car, connected car, health care, digital education, smart retail, security and safety services. Disclosed are a method and an apparatus for obtaining channel congestion information of an unlicensed band and performing cell reselection for a terminal, in a next-generation mobile communication system.

8 Claims, 17 Drawing Sheets

(51) Int. Cl.
  *H04W 74/0808* (2024.01)
  *H04W 74/0833* (2024.01)
  *H04W 36/06* (2009.01)
  *H04W 36/22* (2009.01)

(52) U.S. Cl.
  CPC ........ *H04W 74/0833* (2013.01); *H04W 36/06* (2013.01); *H04W 36/22* (2013.01)

(56) References Cited

U.S. PATENT DOCUMENTS

| | | | |
|---|---|---|---|
| 10,548,167 B2 | 1/2020 | Ahn et al. | |
| 10,638,407 B2 | 4/2020 | Kim et al. | |
| 2016/0380779 A1* | 12/2016 | Sharma | H04W 72/1215 370/312 |
| 2017/0231011 A1 | 8/2017 | Park et al. | |
| 2017/0257850 A1* | 9/2017 | Oh | H04W 74/085 |
| 2017/0295497 A1* | 10/2017 | MacMullan | H04W 16/14 |
| 2018/0124612 A1 | 5/2018 | Babaei et al. | |
| 2018/0124831 A1 | 5/2018 | Dinan | |
| 2018/0176961 A1* | 6/2018 | Babaei | H04W 74/0833 |
| 2019/0045437 A1* | 2/2019 | Krishnamoorthy | H04W 28/0221 |
| 2021/0282191 A1* | 9/2021 | Chang | H04W 16/18 |
| 2021/0307072 A1* | 9/2021 | Kusashima | H04W 74/0816 |
| 2022/0330335 A1* | 10/2022 | Ahn | H04W 56/00 |

FOREIGN PATENT DOCUMENTS

| | | |
|---|---|---|
| KR | 10-2017-0091051 A | 8/2017 |
| KR | 10-2017-0138471 A | 12/2017 |
| WO | 2017/136458 A2 | 8/2017 |
| WO | 2020/198584 A1 | 10/2020 |

OTHER PUBLICATIONS

Samsung, 'On indicating LBT failure for NR-U', R2-1815311, 3GPP TSG-RAN WG2 Meeting #103bis, Sep. 28, 2018.
Google: "Consistent LBT failure detection and recovery", 3GPP Draft; R2-1910688 Consistent LBT Failure Detection and Recovery, 3rd Generation Partnership Project (3GPP), Mobile Competence Centre ; 650, Route Des Lucioles ; F-06921 Sophia-Antipolis Cedex ; France, RAN WG2, Prague, Czech Republic; Aug. 26, 2019-Aug. 30, 2019, Aug. 15, 2019.
European Search Report dated Nov. 2, 2021, issued in European Application No. 19878699.8.
Korean Office Action dated Aug. 7, 2023, issued in Korean Patent Application No. 10-2018-0130022.
Korean Notice of Allowance dated Feb. 19, 2024, issued in Korean Patent Application No. 0-2018-0130022.
Chinese Office Action dated Jan. 26, 2024, issued in Chinese Patent Application No. 1201980071681.1.

* cited by examiner

METHOD AND APPARATUS FOR PERFORMING CELL RESELECTION IN NEXT-GENERATION MOBILE COMMUNICATION SYSTEM OPERATING IN UNLICENSED FREQUENCY BAND

TECHNICAL FIELD

The disclosure relates to a method and an apparatus for acquiring channel congestion information of an unlicensed band and performing cell resection regarding a terminal.

BACKGROUND ART

To meet the demand for wireless data traffic having increased since deployment of 4G communication systems, efforts have been made to develop an improved 5G or pre-5G communication system. Therefore, the 5G or pre-5G communication system is also called a "Beyond 4G Network" or a "Post LTE System". The 5G communication system is considered to be implemented in higher frequency (mmWave) bands, e.g., 60 GHz bands, so as to accomplish higher data rates. To decrease propagation loss of the radio waves and increase the transmission distance, the beamforming, massive multiple-input multiple-output (MIMO), full dimensional MIMO (FD-MIMO), array antenna, an analog beam forming, large scale antenna techniques are discussed in 5G communication systems. In addition, in 5G communication systems, development for system network improvement is under way based on advanced small cells, cloud radio access networks (RANs), ultra-dense networks, device-to-device (D2D) communication, wireless backhaul, moving network, cooperative communication, coordinated multi-points (CoMP), reception-end interference cancellation and the like. In the 5G system, hybrid FSK and QAM modulation (FQAM) and sliding window superposition coding (SWSC) as an advanced coding modulation (ACM), and filter bank multi carrier (FBMC), non-orthogonal multiple access (NOMA), and sparse code multiple access (SCMA) as an advanced access technology have also been developed.

The Internet, which is a human centered connectivity network where humans generate and consume information, is now evolving to the Internet of things (IoT) where distributed entities, such as things, exchange and process information without human intervention. The Internet of everything (IoE), which is a combination of the IoT technology and the big data processing technology through connection with a cloud server, has emerged. As technology elements, such as "sensing technology", "wired/wireless communication and network infrastructure", "service interface technology", and "security technology" have been demanded for IoT implementation, a sensor network, a machine-to-machine (M2M) communication, machine type communication (MTC), and so forth have been recently researched. Such an IoT environment may provide intelligent Internet technology services that create a new value to human life by collecting and analyzing data generated among connected things. IoT may be applied to a variety of fields including smart home, smart building, smart city, smart car or connected cars, smart grid, health care, smart appliances and advanced medical services through convergence and combination between existing information technology (IT) and various industrial applications.

In line with this, various attempts have been made to apply 5G communication systems to IoT networks. For example, technologies such as a sensor network, machine type communication (MTC), and machine-to-machine (M2M) communication may be implemented by beamforming, MIMO, and array antennas. Application of a cloud radio access network (RAN) as the above-described big data processing technology may also be considered an example of convergence of the 5G technology with the IoT technology.

Meanwhile, there has been ongoing development of NR-U technology such that a data communication service can be provided by using only an unlicensed band in a next-generation mobile communication system. The unlicensed frequency band has already been used by other wireless communication systems (for example, WiFi), and a communication operator may share the same with another next-generation mobile communication system. In order to efficiently share and use the unlicensed frequency band between other wireless communication systems or between next-generation mobile communication systems operated by other operators, a listen-before-talk (LBT) process is necessary as follows: prior to using the unlicensed frequency band, it is necessary to confirm whether another user is using the same, and to acquire an opportunity to use the frequency band through competition.

DISCLOSURE OF INVENTION

Technical Problem

[1] It is an aspect of the disclosure to propose a terminal operation in an unlicensed frequency band in which an LBT failure has occurred due to severe competition. It is another aspect of the disclosure to propose that a terminal report predetermined information so as to make it possible to identify the degree of competition experienced by an unlicensed frequency currently used by a base station with another wireless system or a mobile communication system operated by another operator.

Solution to Problem

Technical problems to be solved by embodiments of the disclosure are not limited to the above-mentioned technical problems, and other technical problems not mentioned herein will be clearly understood from the following description by a person skilled in the art to which the disclosure pertains.

In accordance with an aspect of the disclosure, a method by a terminal in a wireless communication system includes: transmitting a first message to a base station; receiving a second message from the base station, based on the first message; and transmitting, to the base station, a third message including random access channel (RACH)-related information for an unlicensed band.

In some embodiments, the RACH-related information for the unlicensed band is a RACH report for the unlicensed band, and the RACH report for the unlicensed band includes information indicating a listen-before-talk (LBT) failure.

In some embodiments, the information indicating the LBT failure includes at least one of whether the LBT failure is detected during a random access process and the number of LBT failures.

In some embodiments, the first message is a radio resource control (RRC) message, and includes an indicator indicating that information related to LBT failure and channel occupancy is stored.

In some embodiments, the second message includes an indicator requesting a RACH report for the unlicensed band.

In another example of the disclosure, a method by a base station in a wireless communication system includes: receiving a first message from a terminal; transmitting a second message from the base station, based on the first message; and receiving a third message including random access channel (RACH)-related information for an unlicensed band from the terminal.

In another example of the disclosure, a terminal includes: a transceiver capable of transmitting and receiving at least one signal; and a controller coupled to the transceiver, wherein the controller is configured to: transmit a first message to a base station; receive a second message from the base station, based on the first message; and transmit a third message including random access channel (RACH)-related information for an unlicensed band to the base station.

In another example of the disclosure, a base station includes: a transceiver capable of transmitting and receiving at least one signal; and a controller coupled to the transceiver, wherein the controller is configured to: receive a first message from a terminal; transmit a second message from the base station, based on the first message; and receive a third message including random access channel (RACH)-related information for an unlicensed band from the terminal.

Advantageous Effects of Invention

An embodiment of the disclosure is advantageous in that, by providing a method for preventing a terminal that has an LBT failure due to severe competition from camping onto an unlicensed frequency band, a more appropriate frequency can be reassigned to the terminal, thereby supporting a service for the terminal.

In addition, another embodiment of the disclosure is advantageous in that, by using information reported from terminals in connection with an unlicensed frequency band, a base station can determine a cell reselection operation of a terminal in a camped-on standby mode or in an active mode according to the situation of the corresponding frequency band.

MODE FOR THE INVENTION

Figure 1A:
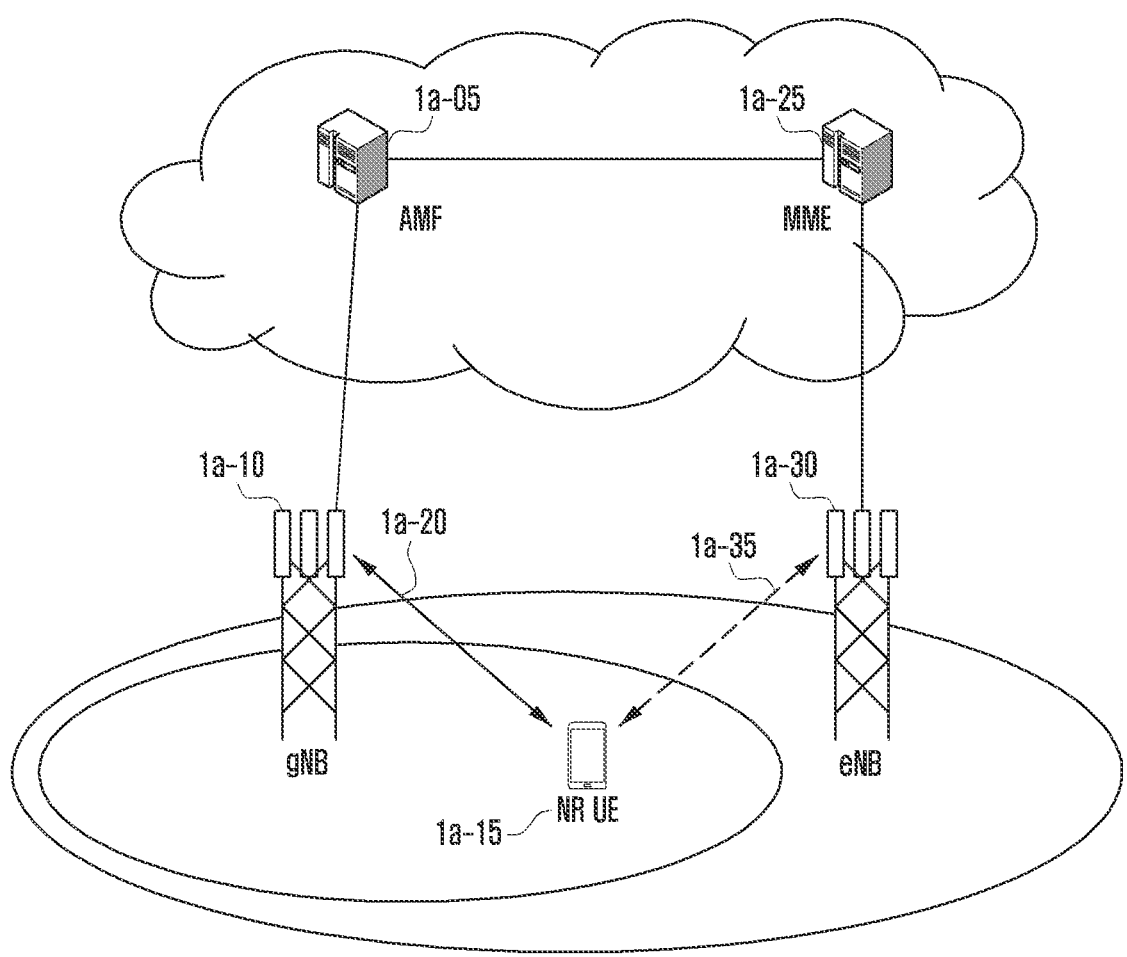
FIG. 1A is a perspective diagram of a next generation mobile communication system.

Hereinafter, embodiments of the disclosure will be described in detail in conjunction with the accompanying drawings. In the following description of the disclosure, a detailed description of known functions or configurations incorporated herein will be omitted when it may make the subject matter of the disclosure unnecessarily unclear. The terms which will be described below are terms defined in consideration of the functions in the disclosure, and may be different according to users, intentions of the users, or customs. Therefore, the definitions of the terms should be made based on the contents throughout the specification.

The advantages and features of the disclosure and ways to achieve them will be apparent by making reference to embodiments as described below in detail in conjunction with the accompanying drawings. However, the disclosure is not limited to the embodiments set forth below, but may be implemented in various different forms. The following embodiments are provided only to completely disclose the disclosure and inform those skilled in the art of the scope of the disclosure, and the disclosure is defined only by the scope of the appended claims. Throughout the specification, the same or like reference numerals designate the same or like elements.

First Embodiment

In the following description of the disclosure, a detailed description of relevant known functions or configurations will be omitted when it may make the subject matter of the disclosure unnecessarily unclear. Hereinafter, embodiments of the disclosure will be described with reference to the accompanying drawings.

FIG. 1A is a perspective view of a next generation mobile communication system.

Referring to FIG. 1A, a radio access network of a next-generation mobile communication system (new radio (NR)) includes a next-generation base station (new radio node B, hereinafter referred to as "gNB") 1a-10 and an access and mobility management function (AMF) (new radio core network) 1a-05. A user terminal (new radio user equipment, hereinafter referred to as "NR UE" or "terminal") 1a-15 can access an external network through the gNB 1a-10 and AMF 1a-05.

In FIG. 1A, the gNB corresponds to an evolved node B (eNB) of an existing LTE system. The gNB is connected to the NR UE via a radio channel and can provide more superior services than the existing Node B 1a-20. In the next-generation mobile communication system, since all user traffic is serviced via a shared channel, a device for scheduling by collecting state information such as a buffer status, an available transmission power status, and a channel status of UEs is required. The gNB 1a-10 is in charge.

One gNB typically controls multiple cells. In order to implement ultra-high-speed data transmission compared to the existing LTE, it may have more than the existing maximum bandwidth, an orthogonal frequency division multiplexing (hereinafter referred to as "OFDM") may be used as a radio access technology, and an additional beamforming technology may be applied. In addition, an adaptive modulation and coding (hereinafter, referred to as "AMC") method that determines a modulation scheme and a channel coding rate according to a channel state of a terminal is applied. The AMF 1a-05 performs functions such as mobility support, bearer setup, and QoS setup.

The AMF is a device in charge of various control functions as well as mobility management functions for terminals, and is connected to multiple base stations. In addition, the next-generation mobile communication system can be linked with the existing LTE system, and the AMF is connected to an MME 1a-25 via a network interface. The MME is connected to an eNB 1a-30, which an existing base station. A terminal supporting LTE-NR dual connectivity can transmit and receive data while maintaining connection to not only the gNB but also the eNB (1a-35).

In the next-generation mobile communication system, an NR-U technology capable of providing a data communication service using only an unlicensed frequency band is being developed. The unlicensed frequency band is already used by other wireless communication systems such as WiFi, and the communication service provider may be shared with other next-generation mobile communication systems. In order to efficiently share and use the unlicensed frequency band between other wireless communication systems or between next-generation mobile communication systems operated by different operators, a listen-before-talk (LBT) process is required. The LBT process is a process of identifying whether other users are using the unlicensed frequency band before using the unlicensed frequency band, and obtaining an opportunity to use the frequency band through competition. Therefore, the opportunity to transmit and receive data is not always guaranteed as in the licensed frequency band.

In the disclosure, the LBT failure means that, through the LBT process, another system or terminal has already occupied the radio channel or the radio channel has not been selected in competition, and thus the terminal fails to finally acquire a data transmission and reception opportunity during a specific time period. The LBT operation may be performed in both the base station and the terminal. For example, the terminal performs an LBT operation in order to transmit data in uplink or transmit data in downlink.

Figure 1B:
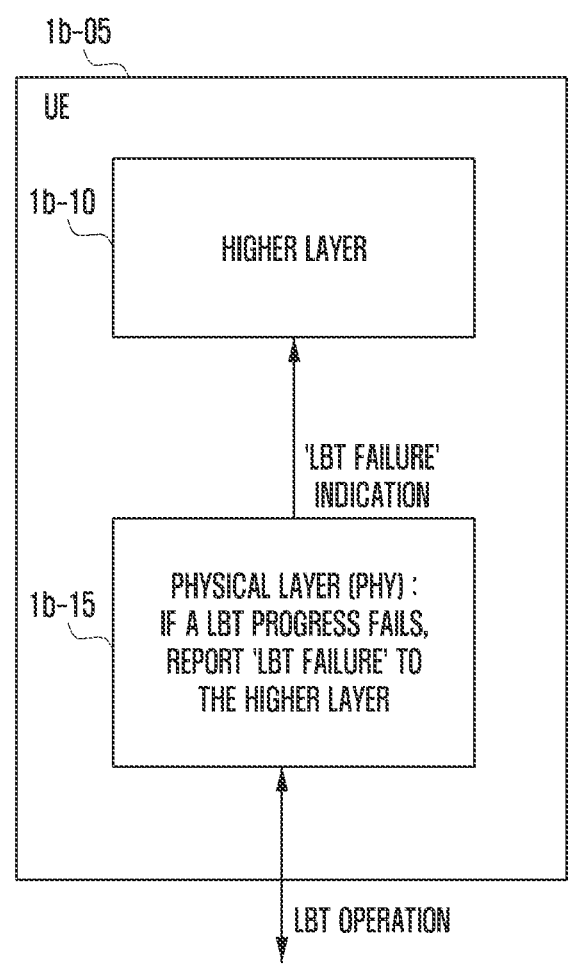
FIG. 1B is a diagram illustrating a process in which a terminal monitors and detects an LBT failure in the disclosure.

FIG. 1B is a diagram explaining a process in which a terminal monitors and detects an LBT failure in the disclosure.

In the disclosure, the terminal 1b-05 may detect the LBT failure at a physical layer 1b-15 or a MAC layer. One LBT failure detected by the layer may be reported to an upper layer, that is, RRC 1b-10 through 'LBT failure' indicator. The one LBT failure may mean a failure in the final competition in the LBT process described in LBT Type 1 of FIG. 1C and LBT Type 2 of FIG. 1D below. Alternatively, when the failure in the final competition in the LBT process described in LBT Type 1 of FIG. 1C and LBT Type 2 of FIG. 1D occurs a set or predetermined number of times, it may mean one LBT failure.

Figure 1C:
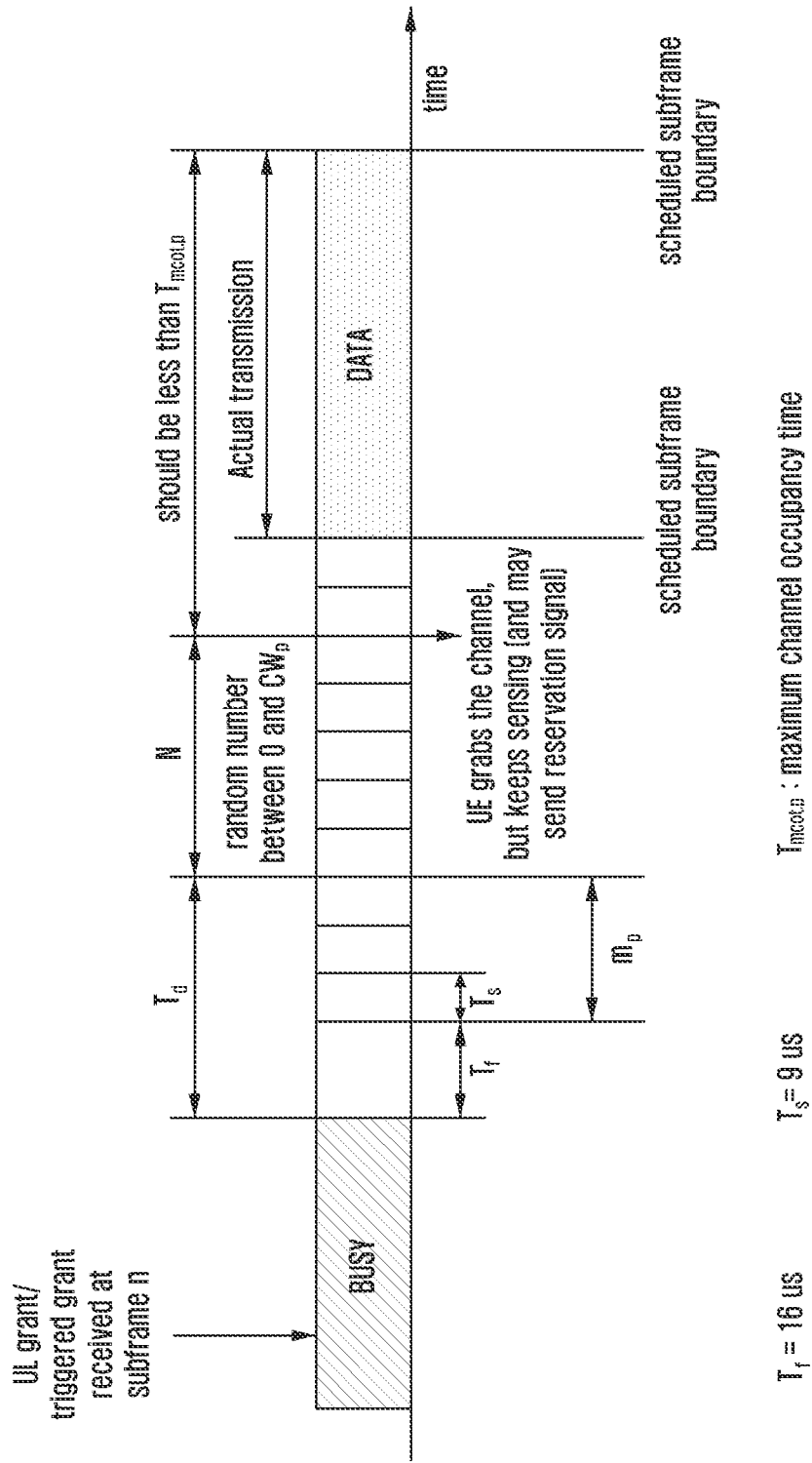
FIG. 1C is a diagram illustrating an LBT Type 1.

FIG. 1C is a diagram illustrating the LBT Type 1.

The LBT Type 1 is a method of randomly determining a time to listen for whether other peripheral devices are transmitting before transmission, and transmitting when the channel is empty for the random time. At this time, the terminal listens first for a fixed time Td, and when the channel is not occupied, it is determined whether the channel is occupied for a random time N.

At this time, it is possible to differentially determine how the values of Td and N are determined according to the priority and importance of traffic, and there may be a total of four different grades. This class is referred to as a channel access priority class (CAPC).

In addition, according to the CAPC, it has a time length of Td=16+mp*9 μs, N=random (0, $CW_p$)*9 μs, and the CW value starts from $CW_{min,p}$, increases approximately twice each time transmission fails, and has a maximum value of $CW_{max,p}$. For example, when performing the LBT using a method having CAPC of 3, Td has a length of 16+3*9=43 μs, and a random value between 0 and 15 is selected for N for initial transmission, for example, if 7 is selected, N becomes 7*9=63 μs, so the communication device can transmit data when the channel is not occupied for 106 μs.

| Channel Access Priority Class (p) | $m_p$ | $CW_{min, p}$ | $CW_{max, p}$ | $T_{mcot, p}$ | allowed $CW_p$ sizes |
|---|---|---|---|---|---|
| 1 | 1 | 3 | 7 | 2 ms | {3, 7} |
| 2 | 1 | 7 | 15 | 3 ms | {7, 15} |
| 3 | 3 | 15 | 63 | 8 or 10 ms | {15, 31, 63} |
| 4 | 7 | 15 | 1023 | 8 or 10 ms | {15, 31, 63, 127, 255, 511, 1023} |

If, as in the above example (when 7 is selected for N), when it is determined that the channel is occupied by another device (i.e., when the received signal strength (RSSI) is greater than or equal to a predetermined threshold) while determining whether the channel is occupied (e.g., 3 out of 7 and remaining 4), the terminal waits until the channel occupancy ends, then waits again for Td, and may perform transmission by determining whether the channel is occupied for the remaining 4.

As can be seen from the above table, the LBT scheme with low CAPC can be used when transmitting high priority traffic.

Figure 1D:
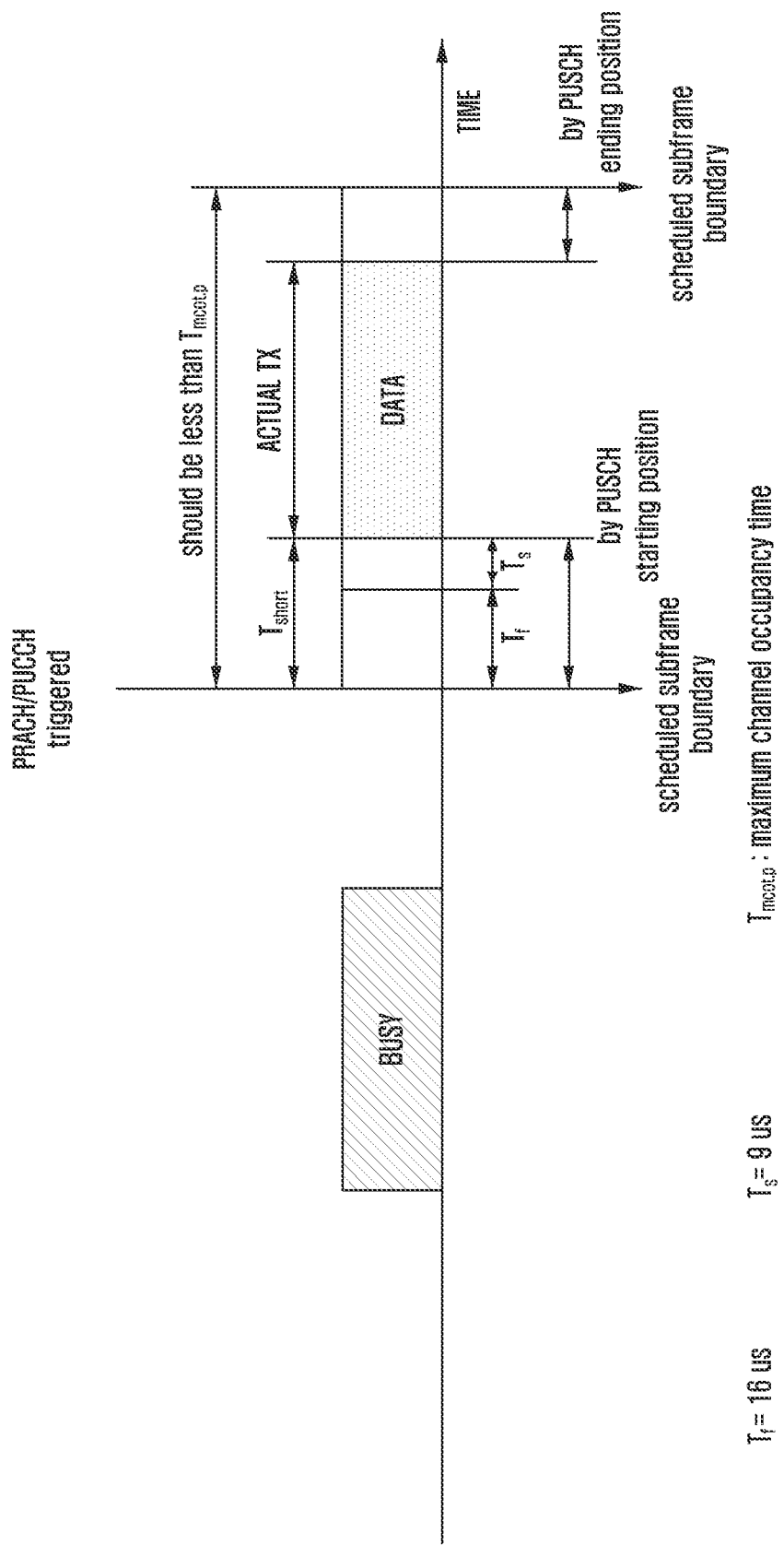
FIG. 1D is a diagram illustrating an LBT Type 2.

FIG. 1D is a diagram illustrating the LBT Type 2.

The LBT Type 2 is a method of immediately transmitting when a channel is not occupied for a fixed period of time because the time to listen for whether other peripheral devices are transmitting before transmission is fixed. That is, in FIG. 1D, when the communication device needs to transmit, the device listens to (or senses) the channel for a fixed time during Tshort (=Tf+Ts) and transmits data immediately if it determines that the channel is not occupied. This is an LBT scheme that can be used when transmitting a signal having a very high priority. Accordingly, the random access preamble, PUCCH, and the like may be transmitted using the LBT scheme as signals of high importance.

Figure 1E:
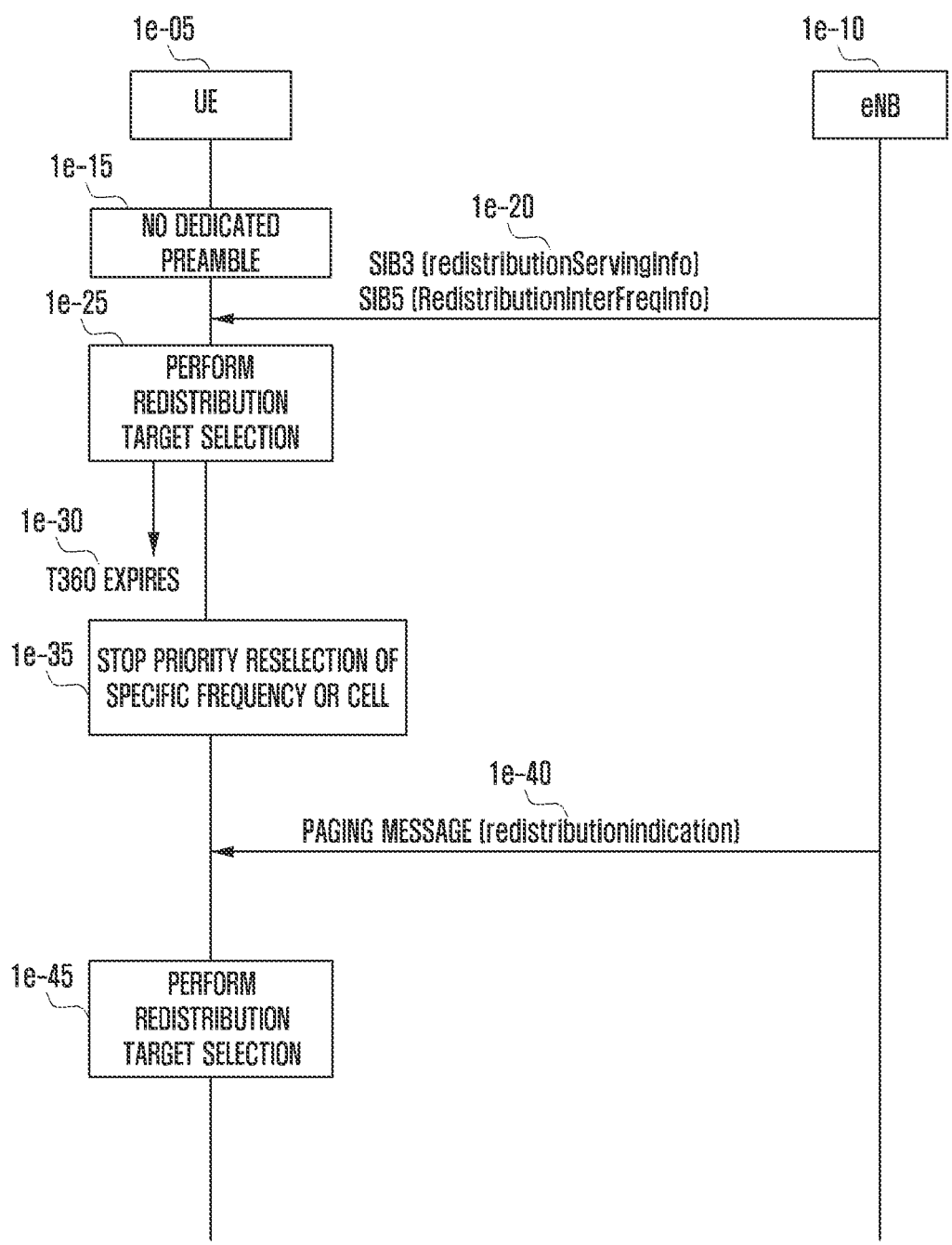
FIG. 1E is a flowchart of redistribution target selection operation in an LTE system.

FIG. 1E is a flowchart of redistribution target selection operation in an LTE system.

In an LTE system, when a lot of loading occurs on a specific frequency or cell, the standby mode terminals camping on may be relocated to another frequency or cell, which is called redistribution target selection.

The redistribution target selection may be applied to a terminal 1e-05 that is not configured with dedicated cell reselection priorities information 1e-15 through a release message, or a terminal that has been provided with the dedicated priorities but has applied the common cell reselection priorities information provided by the current system information after an effective time has elapsed. In addition, the terminal has to support the redistribution target selection. The terminal that has been in the connected mode at least once may report, to the network, an indicator indicating whether the terminal supports redistribution target selection.

The base station 1e-10 may broadcast the parameters related to the redistribution target selection using system information (1e-20). The system information may be system information block (SIB) 3 and SIB 5. The parameters related to redistribution target selection stored in SIB 3 and SIB 5 are described in the standard document TS36.331, for reference. If redistrOnPagingOnly-r13 is set to True in SIB 3, the redistribution target selection operation to which the parameters are applied is not immediately performed, and the operation can be performed when a paging message is indicated. If redistrOnPagingOnly-r13 is not set to True, the terminal receiving the parameter may immediately perform a redistribution target selection operation (1e-25). If the parameters are used according to a predetermined rule, a frequency or cell to be re-selected by the standby mode terminal can be derived. More specifically, the predetermined rule may be determined by referring to the content of the 5.2.4.10.1 redistribution target selection part of the 5.2.4.10 E-UTRAN inter-frequency redistribution procedure of TS 36.331.

5.2.4.10.1 Redistribution Target Selection

The UE shall compile a sorted list of one or more candidate redistribution targets, and for each candidate entry [j] a valid redistrFactor[j], in which entries are added in increasing index order starting with index 0 as follows:
  for the serving frequency (redistributionFactorServing is included in SystemInformationBlockType3 whenever redistribution is configured):
    the serving cell if redistributionFactorCell is included; otherwise the serving frequency;
    In both cases, redistrFactor[0] is set to redistributionFactorServing;
  for each entry in InterFreqCarrierFreqList and subsequent for each entry in InterFreqCarrierFreqListExt:
    the cell ranked as the best cell on this frequency according to section 5.2.4.6 if redistributionNeighCellList is configured and includes this cell;
    otherwise, the concerned frequency if redistributionFactorFreq is configured and if at least one cell on the frequency fullfills the cell selection criterion S defined in 5.2.3.2;
    If the cell is included, redistrFactor[j] is set to the corresponding redistributionFactorCell; If the frequency is included, redistrFactor[j] is set to the corresponding redistributionFactorFreq;

The UE shall choose a redistribution target as follows:
If ueID≤200·redistrRange[0], the UE shall choose the frequency or the cell corresponding to redistrFactor[0] as its redistribution target or;
If $200 \cdot \Sigma_{j=0}^{j=i-1} redistrRange[j] < ueID \leq 200 \cdot \Sigma_{j=0}^{j=i} redistrRange[j]$, then the UE shall choose the frequency or cell corresponding to redistrFactor[i] as its redistribution target;
ueID=(IMSI mod 100)·2+1;
If there are no redistribution candidates apart from the serving frequency or cell, the redistrRange[0]=1. Otherwise, the redistrRange[i] of E-UTRAN frequency or cell is defined by:

$$redistrRange[i] = \frac{redistrFactor[i]}{\sum_{j=0}^{j=(maxCandidates-1)} redistrFactor[j]}$$

Where: maxCandidates is the total number of frequencies cells with valid redistrFactor[j].

5.2.4.10.1 Redistribution Target Selection

The UE shall compile a sorted list of one or more candidate redistribution targets, and for each candidate entry [j] a valid redistrFactor[j], in which entries are added in increasing index order starting with index 0 as follows:
  for the serving frequency (redistributionFactorServing is included in SystemInformationBlockType3 whenever redistribution is configured):
    the serving cell if redistributionFactorCell is included; otherwise the serving frequency;
    In both cases, redistrFactor[0] is set to redistributionFactorServing;
  for each entry in InterFreqCarrierFreqList and subsequent for each entry in InterFreqCarrierFreqListExt:
    the cell ranked as the best cell on this frequency according to section 5.2.4.6 if redistributionNeighCellList is configured and includes this cell;
    otherwise, the concerned frequency if redistributionFactorFreq is configured and if at least one cell on the frequency fullfills the cell selection criterion S defined in 5.2.3.2;
    If the cell is included, redistrFactor[j] is set to the corresponding redistributionFactorCell; If the frequency is included, redistrFactor[j] is set to the corresponding redistributionFactorFreq;

The UE shall choose a redistribution target as follows:
If ueID≤200·redistrRange[0], the UE shall choose the frequency or the cell corresponding to redistrFactor[0] as its redistribution target or;
If $200 \cdot \Sigma_{j=0}^{j=i-1} redistrRange[j] < ueID \leq 200 \cdot \Sigma_{j=0}^{j=i} redistrRange[j]$, then the UE shall choose the frequency or cell corresponding to redistrFactor[i] as its redistribution target;
ueID=(IMSI mod 100)·2+1;
If there are no redistribution candidates apart from the serving frequency or cell, the redistrRange[0]=1.
Otherwise, the redistrRange[i] of E-UTRAN frequency or cell is defined by:

$$redistrRange[i] = \frac{redistrFactor[i]}{\sum_{j=0}^{j=(maxCandidates-1)} redistrFactor[j]}$$

Where: maxCandidates is the total number of frequencies/cells with valid redistrFactor[j].

When the redistribution target selection operation is performed, the T360 timer may start to be started, and the T360 timer may be started at the same time as when the redistribution target selection operation is performed. When the timer expires (1e-30), priority reselection of a specific frequency or cell according to the operation may be stopped (1e-35).

If redistrOnPagingOnly-r13 is set to True in SIB 3, when a redistribution Indication indicator is present in a received paging message (1e-40), a redistribution target selection operation applying the parameters may be performed (1e-45).

Figure 1F:
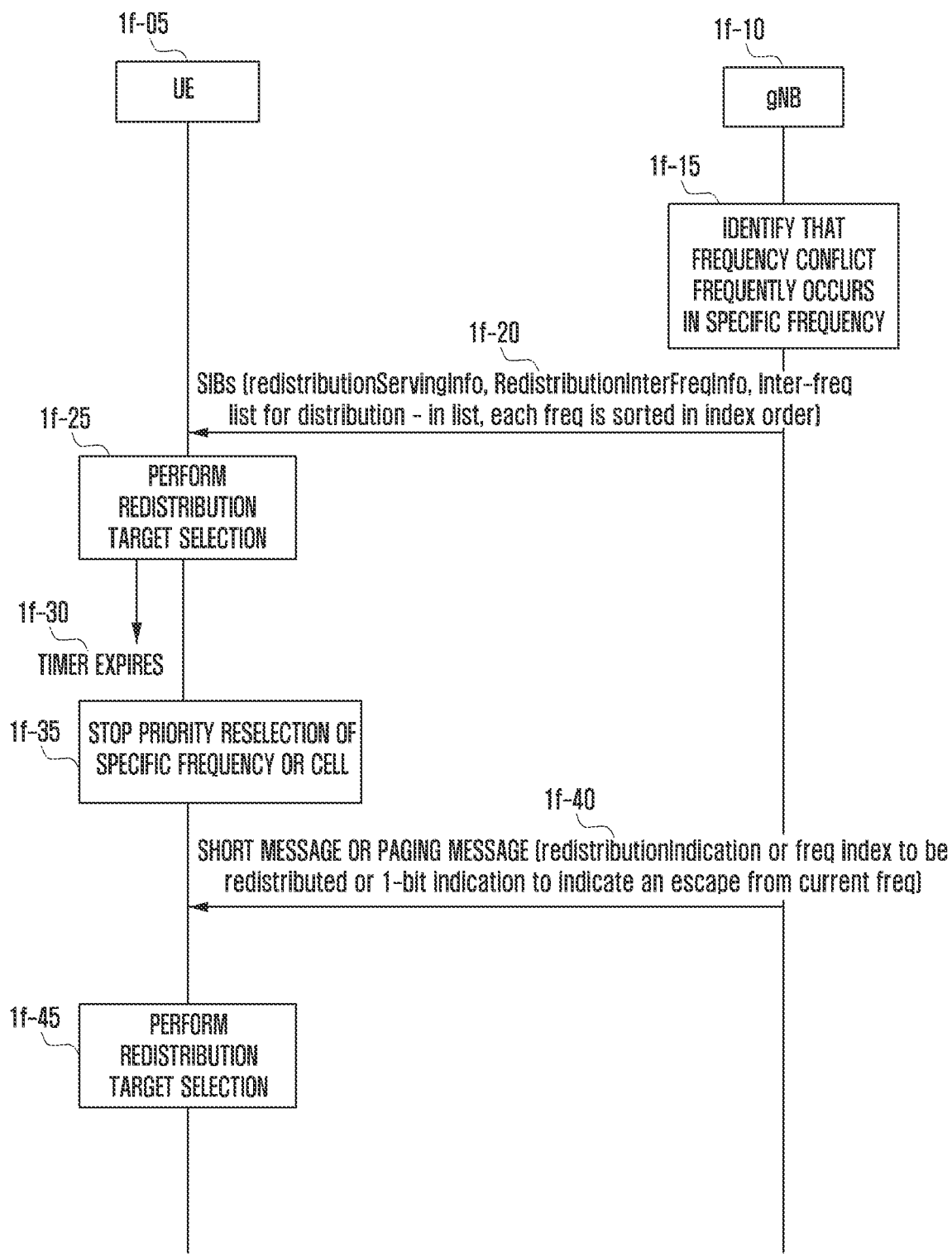
FIG. 1F is a flowchart of an operation of suppressing camping-on of a terminal in an unlicensed frequency band with severe contention in the disclosure.

FIG. 1F is a flowchart of an operation of suppressing camping-on of a terminal in an unlicensed frequency band with severe contention in the disclosure.

The base station 1f-10 of the next-generation mobile communication system operating in a specific unlicensed frequency band may consider that it is necessary to relocate terminals in standby mode or inactive mode camping-on at the corresponding frequency to another frequency when the LBT failure occurs more often than a specific threshold in downlink, when LBT the failure occurs more often than a specific threshold from the terminal, or when it is reported that the time required for successful transmission is greater than a specific threshold (1*f*-15). Due to frequent LBT failure, the redistribution target selection operation may be set and performed only in a frequency unit, not a cell unit.

The base station may provide parameters related to redistribution target selection through system information (1*f*-20). In particular, among the parameters, a list of valid frequencies and a list of index values corresponding thereto may be included.

Since the competition situation with other systems or other operators' systems can change rapidly, regardless of whether to have valid dedicated cell reselection priorities information previously provided through a release message, the terminal receiving the parameter related to the redistribution target selection may perform a redistribution target selection operation (1*f*-25). If an indicator having the same function as redistrOnPagingOnly-r13 in the system information is set to True, even if a parameter related to the redistribution target selection is received, the redistribution target selection operation may not be performed until a short message including a separate indicator is received.

When the redistribution target selection operation is performed, a predetermined timer may start to be started at the same time, and a predetermined timer may start to be started at the same time as when the redistribution target selection operation is performed. When the timer expires (1*f*-30), priority reselection of a specific frequency or cell according to the operation may be stopped (1*f*-35). The timer value may be provided as the system information.

In the disclosure, the short message may include a first indicator indicating execution of a redistribution target selection operation (1*f*-40). The short message is transmitted on the PDCCH using P-RNTI, and DCI format 1_0 is applied. The P-RNTI may have a corresponding paging message. In this case, the DCI may include scheduling information of the paging message. Upon receiving the short message including the first indicator indicating the execution of the redistribution target selection operation, the terminal may immediately perform a redistribution target selection operation using related parameters provided as system information (1*f*-45).

In addition, in order to quickly relocate the terminal to another frequency (camping-on), the short message may include other indicators in addition to the indicator. For example, one index value corresponding to one frequency may be provided as a second indicator from the frequency index list provided as the system information. This may indicate that the terminal receiving the short message should reselect the frequency indicated by the index.

In addition, the third indicator is a 1-bit indicator, and may indicate reselect to one of an arbitrary frequency from the current frequency or valid frequencies provided as the system information. If, in addition to the first indicator indicating the execution of the redistribution target selection operation, the second or third indicator described above is included, the first indicator may be ignored. If both the second and third indicators are provided, either one can be chosen arbitrarily, or the second indicator can be given preference. Only one of the suggested indicators contained in the short message may be defined in the short message.

A terminal that does not support NR-U or does not support redistribution target selection operation may ignore the indicator of the short message.

Figure 1G:
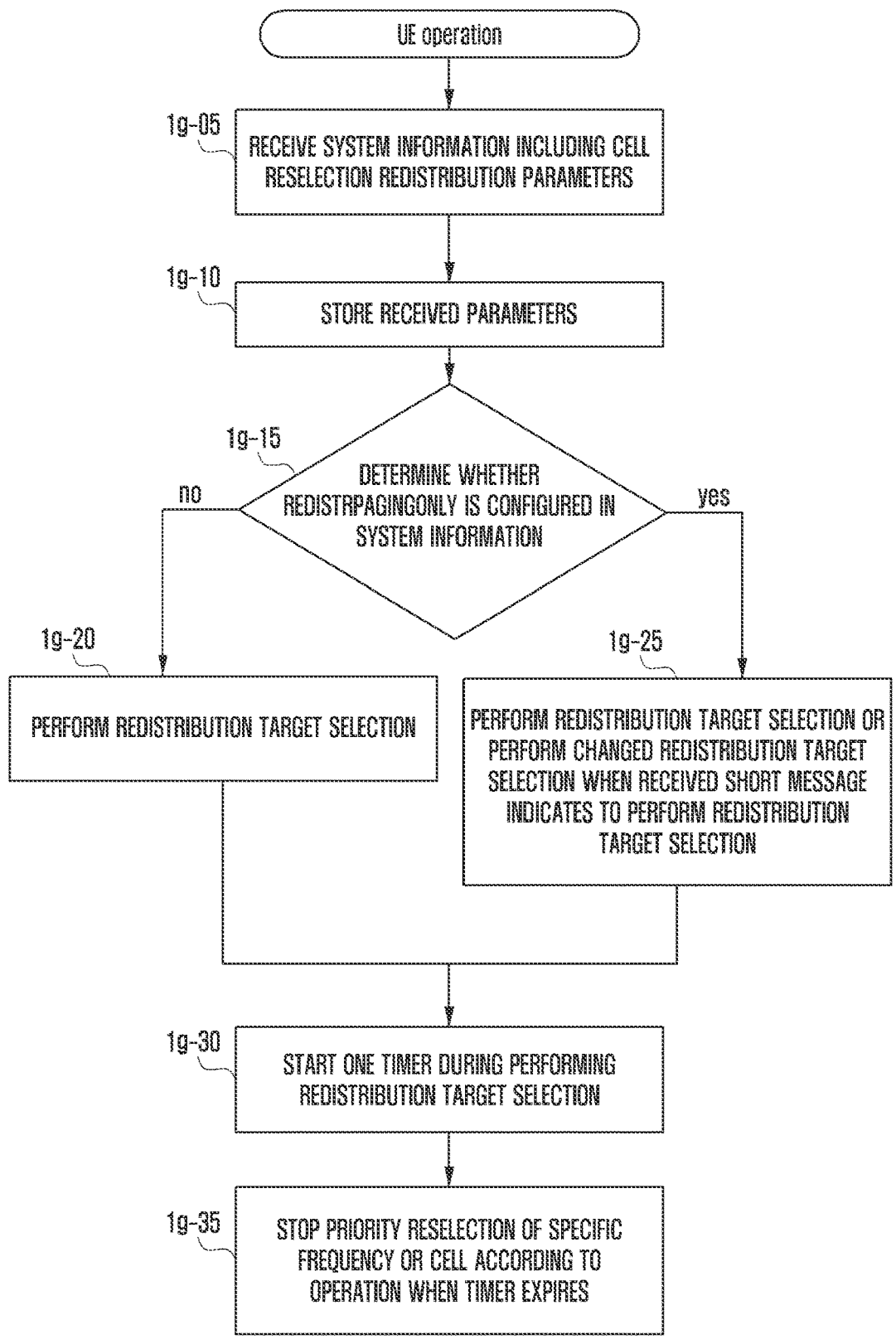
FIG. 1G is a flowchart of a terminal operation in the disclosure.

FIG. 1G is a flowchart of a terminal operation in the disclosure.

In step 1*g*-05, the terminal may receive system information including cell reselection redistribution parameters from the base station. Among the parameters, a list of valid frequencies and a list of index values corresponding thereto may be included.

In step 1*g*-10, the terminal may store the received parameters.

In step 1*g*-15, the terminal may determine whether a predetermined indicator is configured in the system information.

In step 1*g*-20, if the indicator is not configured, after acquiring cell reselection redistribution parameters through the system information, a redistribution target selection operation may be started immediately.

In step 1*g*-25, if the indicator is configured, when indicated by a short message, a redistribution target selection operation may be performed using a parameter included in the system information.

In steps 1*g*-30, while performing the redistribution target selection operation, one timer may be started.

In steps 1*g*-35, when the timer expires, priority reselection of a specific frequency or cell according to the operation may be stopped.

Figure 1H:
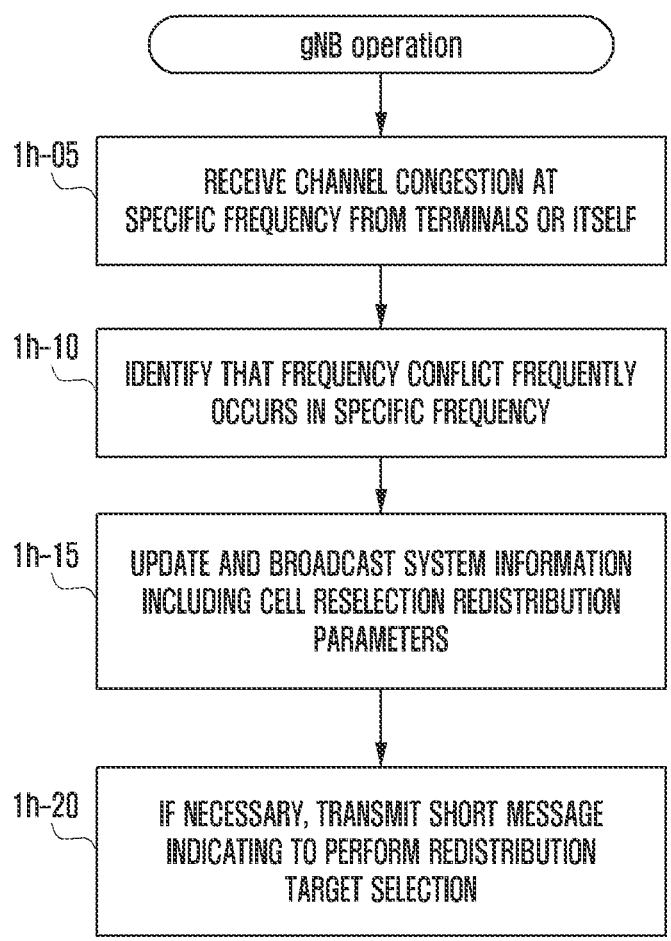
FIG. 1H is a flowchart of operation of a base station in the disclosure.

FIG. 1H is a flowchart of a base station operation in the disclosure.

In steps 1*h*-05, the base station may receive a report of congestion information on unlicensed frequencies from the terminals. In addition, the base station itself may also collect the congestion information.

In step 1*h*-10, the base station may recognize that congestion occurs above a specific threshold at a specific unlicensed frequency. There are various definitions or references for determining the degree of congestion. For example, definitions or references may be an average number of LBT failures occurring when transmitting uplink and downlink data, and an average time required for successful data transmission.

In step 1*h*-15, the base station configures a cell reselection redistribution parameter to move the standby mode or inactive mode terminal camping-on at the congested frequency to another frequency, and broadcasts updated system information including the same.

In steps 1*h*-20, if necessary, the base station may instruct certain terminals to perform a redistribution target selection operation through a short message.

Figure 1I:
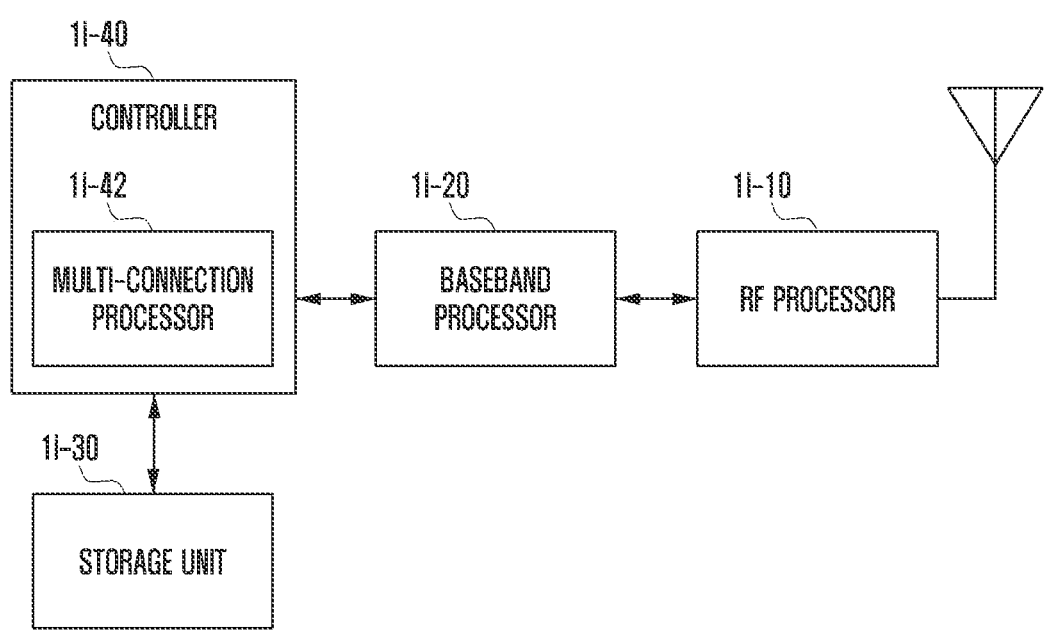
FIG. 1I is a block diagram illustrating an internal structure of a terminal to which the disclosure is applied.

FIG. 1I is a block diagram illustrating an internal structure of a terminal to which the disclosure is applied.

Referring to FIG. 1I, the terminal includes a radio frequency (RF) processor 1*i*-10, a baseband processor 1*i*-20, a storage unit 1*i*-30, and a controller 1*i*-40.

The RF processor 1*i*-10 may perform functions of transmitting and receiving a signal through a wireless channel such as band conversion and amplification of a signal. That is, the RF processor 1*i*-10 may up-convert the baseband signal provided from the baseband processor 1*i*-20 to an RF band signal, transmit the same through an antenna, and down-convert the RF band signal received through the antenna to a baseband signal. For example, the RF processor 1*i*-10 may include a transmission filter, a reception filter, an amplifier, a mixer, an oscillator, a digital to analog convertor (DAC), and an analog to digital convertor (ADC). In FIG. 1I, only one antenna is shown, but the terminal may include a plurality of antennas.

In addition, the RF processor 1i-10 may include a plurality of RF chains. Furthermore, the RF processor 1i-10 may perform beamforming. For the beamforming, the RF processor 1i-10 may adjust a phase and a magnitude of signals transmitted and received through a plurality of antennas or antenna elements. Further, the RF processor 1i-10 may perform MIMO, and may receive multiple layers when performing the MIMO operation.

The baseband processor 1i-20 may perform a function of converting between a baseband signal and a bit string according to a physical layer standard of a system. For example, when transmitting data, the baseband processor 1i-20 may generate complex symbols by encoding and modulating a transmission bit stream. In addition, when receiving data, the baseband processor 1i-20 may restore a received bit stream through demodulation and decoding of the baseband signal provided from the RF processor 1i-10. For example, in the case of the orthogonal frequency division multiplexing (OFDM) method, when transmitting data, the baseband processor 1i-20 may generate complex symbols by encoding and modulating a transmission bit stream, map the complex symbols to subcarriers, and configure OFDM symbols through the inverse fast Fourier transform (IFFT) operation and cyclic prefix (CP) insertion.

In addition, when receiving data, the baseband processor 1i-20 may divide the baseband signal provided from the RF processor 1i-10 in units of OFDM symbols, restore the signals mapped to the subcarriers through the fast Fourier transform (FFT) operation, and restore the received bit stream through demodulation and decoding.

The baseband processor 1i-20 and the RF processor 1i-10 may transmit or receive signals as described above. Accordingly, the baseband processor 1i-20 and the RF processor 1i-10 may be referred to as a transmitter, a receiver, a transceiver, or a communication unit. Furthermore, at least one of the baseband processor 1i-20 and the RF processor 1i-10 may include a plurality of communication modules to support a plurality of different wireless access technologies. For example, the different wireless access technologies may include a wireless LAN (e.g., IEEE 802.11), a cellular network (e.g., LTE), and the like. In addition, the different frequency bands may include a super high frequency (SHF) (e.g., 2.NRHz, NRhz) band, and a millimeter wave (e.g., 60 GHz) band.

The storage unit 1i-30 may store data such as a basic program, an application program, and setting information for the operation of the terminal. In particular, the storage unit 1i-30 may store information related to a second access node performing wireless communication using a second wireless access technology. Further, the storage unit 1i-30 may provide stored data according to the request of the controller 1i-40.

The controller 1i-40 controls overall operations of the terminal. For example, the controller 1i-40 may transmit and receive signals through the baseband processor 1i-20 and the RF processor 1i-10. In addition, the controller 1i-40 may write and read data in the storage unit 1i-40. To this end, the controller 1i-40 may include at least one processor. For example, the controller 1i-40 may include a communication processor (CP) that controls communication and an application processor (AP) that controls an upper layer such as an application program.

Figure 1J:
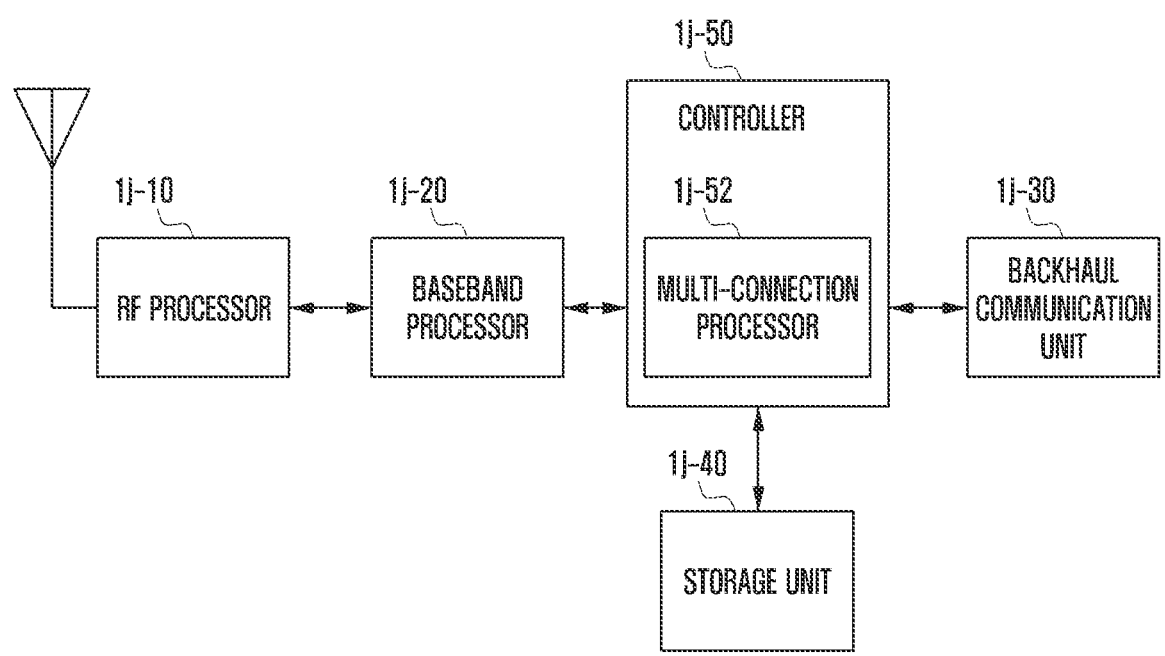
FIG. 1J is a block diagram illustrating a configuration of a base station according to the disclosure.

FIG. 1J is a block diagram illustrating a configuration of a base station according to the disclosure.

As shown in FIG. 1J, the base station includes an RF processor 1j-10, a baseband processor 1j-20, a backhaul communication unit 1j-30, a storage unit 1j-40, and a controller 1j-50.

The RF processor 1j-10 may perform a function of transmitting and receiving a signal through a wireless channel such as band conversion and amplification of a signal. That is, the RF processor 1j-10 may up-convert the baseband signal provided from the baseband processor 1j-20 to an RF band signal, transmit the same through an antenna, and down-convert the RF band signal received through the antenna to a baseband signal. For example, the RF processor 1j-10 may include a transmission filter, a reception filter, an amplifier, a mixer, an oscillator, a DAC, an ADC, and the like. In FIG. 1J, only one antenna is shown, but the first access node may include a plurality of antennas. In addition, the RF processor 1j-10 may include a plurality of RF chains.

Furthermore, the RF processor 1j-10 may perform beamforming. For the beamforming, the RF processor 1j-10 may adjust a phase and a magnitude of each of signals transmitted and received through a plurality of antennas or antenna elements. The RF processor 1j-10 may perform a downlink MIMO operation by transmitting one or more layers.

The baseband processor 1j-20 may perform a function of converting between a baseband signal and a bit stream according to a physical layer standard of the first wireless access technology. For example, when transmitting data, the baseband processor 1j-20 may generate complex symbols by encoding and modulating a transmission bit stream. In addition, when receiving data, the baseband processor 1j-20 may restore the received bit stream through demodulation and decoding of the baseband signal provided from the RF processor 1j-10. For example, in the case of the OFDM scheme, when transmitting data, the baseband processor 1j-20 may generate complex symbols by encoding and modulating the transmission bit stream, map the complex symbols to subcarriers, and configure OFDM symbols through IFFT operation and CP insertion.

In addition, when receiving data, the baseband processor 1j-20 may divide the baseband signal provided from the RF processor 1j-10 into units of OFDM symbols, restore the signals mapped to subcarriers through FFT operation, and restore the received bit stream through demodulation and decoding. The baseband processor 1j-20 and the RF processor 1j-10 may transmit or receive signals as described above. Accordingly, the baseband processor 1j-20 and the RF processor 1j-10 may be referred to as a transmitter, a receiver, a transceiver, a communication unit, or a wireless communication unit.

The backhaul communication unit 1j-30 may provide an interface for performing communication with other nodes in a network. That is, the backhaul communication unit 1j-30 may convert the bit stream transmitted from the main station to another node, for example, an auxiliary base station, a core network, etc., into physical signals, and convert the physical signals received from the other node into a bit stream.

The storage unit 1j-40 may store data such as a basic program, an application program, and setting information for the operation of the main station. In particular, the storage unit 1j-40 may store information on bearers allocated to the connected terminal, measurement results reported from the connected terminal, and the like. In addition, the storage unit 1j-40 may store information that is a criterion for determining whether to provide multiple connections to the terminal or to stop. In addition, the storage unit 1*j*-40 may provide stored data according to the request of the controller 1*j*-50.

The controller 1*j*-50 may control overall operations of the main station. For example, the controller 1*j*-50 may transmit and receive signals through the baseband processor 1*j*-20 and the RF processor 1*j*-10 or through the backhaul communication unit 1*j*-30. In addition, the controller 1*j*-50 may write and read data in and from the storage unit 1*j*-40. To this end, the controller 1*j*-50 may include at least one processor.

Second Embodiment

In the following description of the disclosure, when it is determined that a detailed description of a related known function or configuration may unnecessarily obscure the subject matter of the disclosure, a detailed description thereof will be omitted. Hereinafter, exemplary embodiments of the disclosure will be described with reference to the accompanying drawings.

Figure 2A:
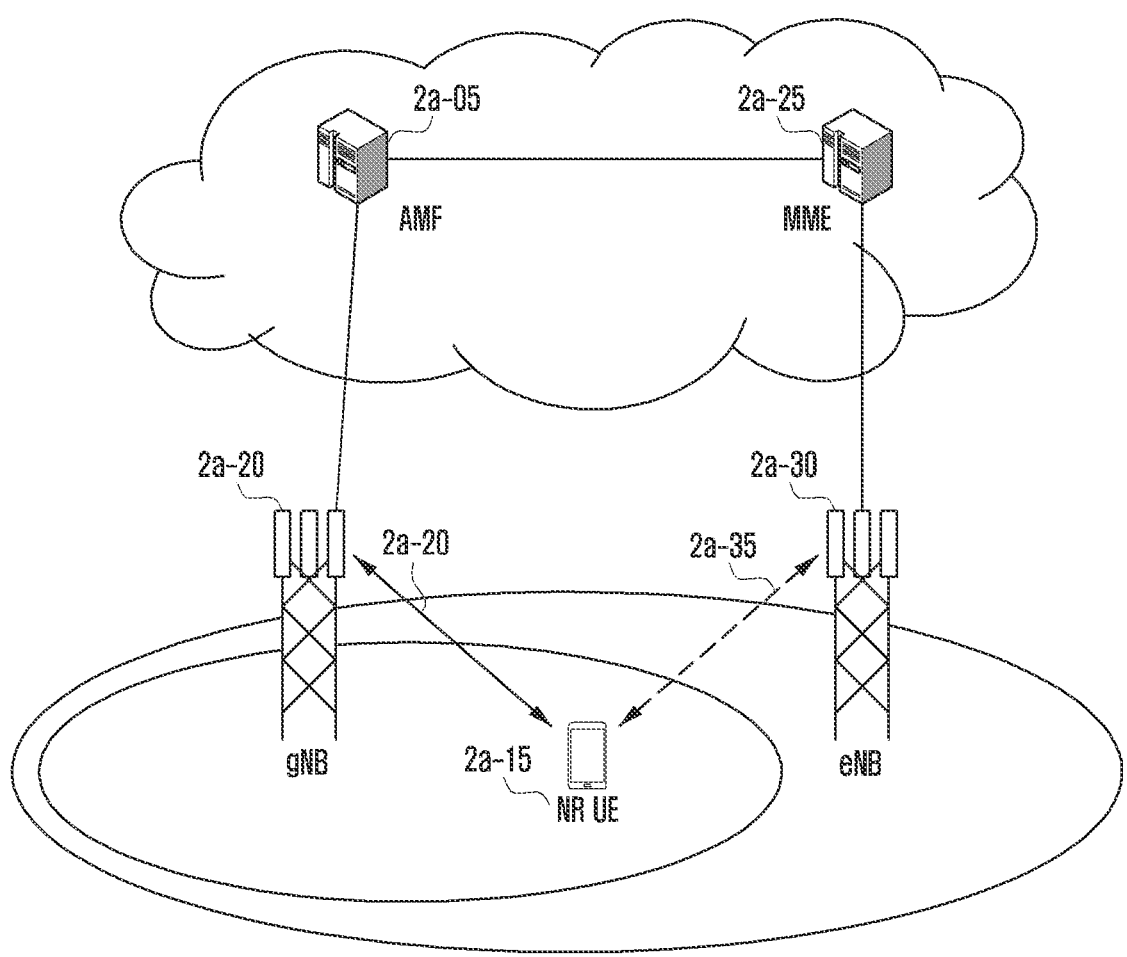
FIG. 2A is a diagram illustrating a structure of a next-generation mobile communication system.

FIG. 2A is a diagram illustrating a structure of a next-generation mobile communication system.

Referring to FIG. 2A, a radio access network of a next-generation mobile communication system (new radio (NR)) includes a next-generation base station (new radio Node B, hereinafter referred to as "gNB") 2*a*-10 and an AMF 2*a*-05 (new radio core network). The user terminal (new radio user equipment, hereinafter referred to as "NR UE" or "terminal") 2*a*-15 accesses the external network through the gNB 2*a*-10 and the AMF 2*a*-05.

In FIG. 2A, the gNB corresponds to an evolved node B (eNB) of an existing LTE system. The gNB may be connected to the NR UE via a radio channel and provide a service superior to that of the existing Node B (2*a*-20). In the next-generation mobile communication system, since all user traffic is serviced through a shared channel, a device for scheduling by collecting state information such as buffer status, available transmission power status, and channel status of UEs is required. The gNB 2*a*-10 is in charge.

One gNB typically controls multiple cells. In order to implement ultra-high-speed data transmission compared to the existing LTE system, it may have more than the existing maximum bandwidth, an orthogonal frequency division multiplexing (hereinafter, referred to as "OFDM") may be used as a radio access technology, and an additional beam-forming technology may be applied. In addition, an adaptive modulation and coding method (hereinafter, referred to as "AMC") is applied to determine a modulation scheme and a channel coding rate according to the channel state of the terminal.

The AMF 2*a*-05 performs functions such as mobility support, bearer setup, and QoS setup. The AMF is a device responsible for various control functions as well as mobility management functions for a terminal, and is connected to a plurality of base stations. In addition, the next-generation mobile communication system may be interlocked with the existing LTE system, and the AMF is connected to the MME 2*a*-25 through a network interface. The MME is connected to the existing eNB 2*a*-30. A terminal supporting LTE-NR dual connectivity may transmit and receive data while maintaining connection to not only the gNB but also the eNB (2*a*-35).

In next-generation mobile communication systems, an NR-U technology that can provide data communication services using only an unlicensed frequency band is being developed. The unlicensed frequency band is already used by other wireless communication systems such as WiFi, and the communication service provider may be shared with other next-generation mobile communication systems. In order to efficiently share and use the unlicensed frequency band between other wireless communication systems or between next-generation mobile communication systems operated by different operators, a listen-before-talk (LBT) process is required. The LBT process is a process of determining whether another user is using the unlicensed frequency band, and obtaining an opportunity to use the frequency band through competition. Therefore, the opportunity to transmit and receive data is not always guaranteed as in the licensed frequency band.

In the disclosure, the LBT failure means that, through the LBT process, another system or terminal has already occupied the radio channel, or the radio channel has not been selected in competition, and thus the terminal fails to finally acquire a data transmission and reception opportunity during a specific time period. The LBT operation may be performed in both the base station and the terminal. For example, the terminal performs an LBT operation to transmit data in uplink or transmit data in downlink.

Figure 2B:
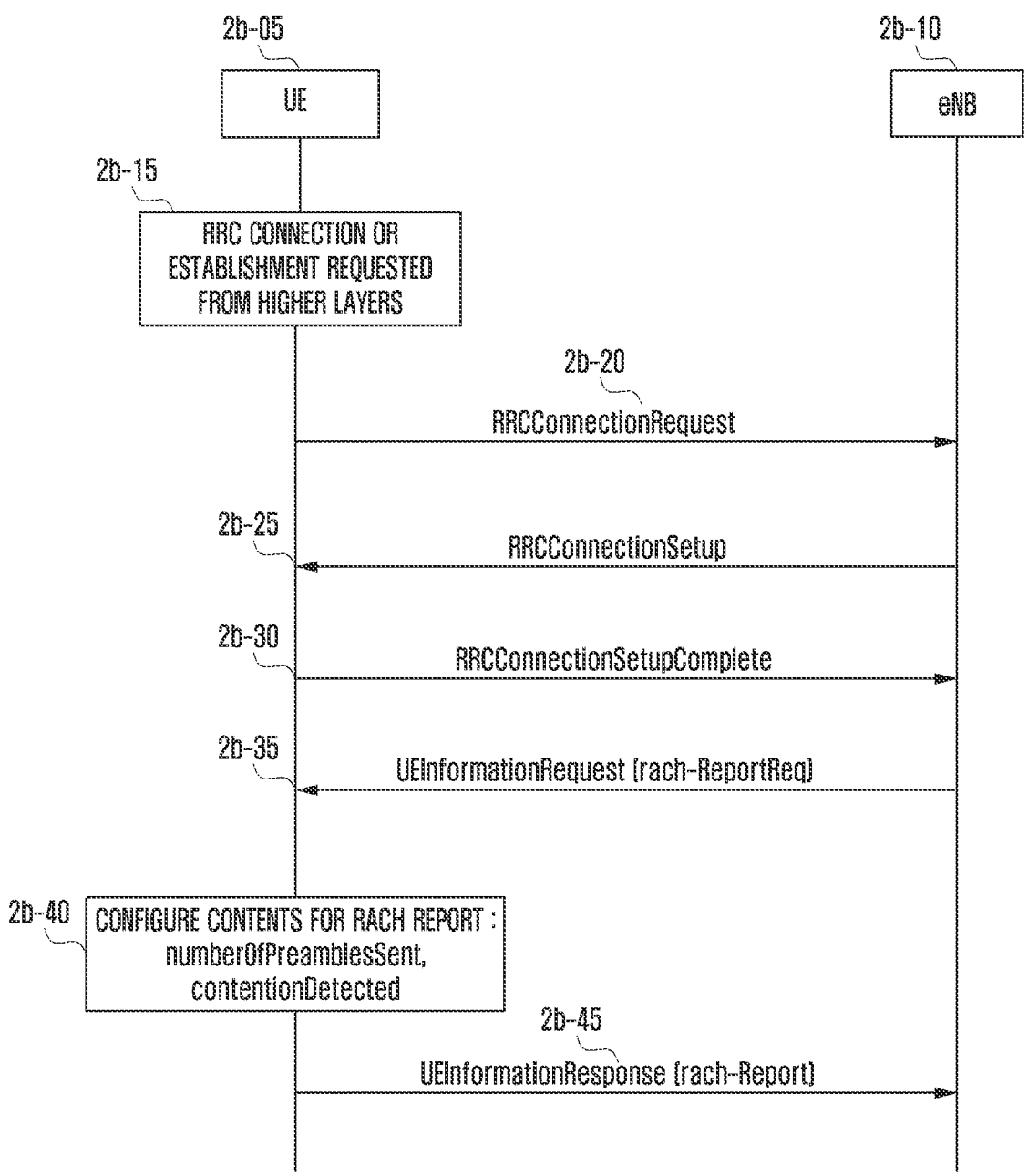
FIG. 2B is a flowchart of a RACH report process in an LTE system.

FIG. 2B is a flowchart of a RACH report process in an LTE system.

In the LTE system, information related to random access performed in the recent establishment process may be reported to a base station. The terminal is largely divided into a logical entity of access-stratum (AS) and non-access-stratum (NAS), and each entity has a different role. For example, the terminal AS performs RRC connection management, RB control, Mobility functions, UE measurement reporting and control, and the like, and the terminal NAS performs bearer management, authentication, ECM-IDLE mobility handling, security control, and the like.

In order to transmit and receive user data or control signals, the AS of the terminal receives an RRC connection request from the terminal NAS (2*b*-15). The terminal 2*b*-05 initializes a random access process in order to switch to the connected mode. The terminal may transmit a message during a random access process (2*b*-20). The message may be msg3, and an RRCConnectionRequest may be transmitted to msg3. In response, a message is received from the base station 2*b*-10 (2*b*-25). The message may be an RRC message, and specifically, may be an RRCConnectionSetup. Upon successfully receiving the RRC message, it is assumed that the terminal has switched to the connected mode.

The terminal may transmit another message as a response message to the received message (2*b*-30). The message may be an RRC message, and specifically, may be an RRCConnectionSetupComplete. The base station may request a result collected during the random access process from the terminal using a request message (2*b*-35). The request message may be a UEInformationRequest. For the request, the base station may include RACH related information in the RRC message. The RACH-related information may be a rach-ReportReq indicator. Upon receiving the RRC message including the indicator, the terminal constructs information collected during the random access process (2*b*-40), stores the same in a response message related to terminal information, and reports the same to the base station (2*b*-45). The response message may be UEInformationResponse. The information collected during the random access process may include information indicating the number of preambles transmitted during a recent successful random access process and information indicating whether contention has occurred in at least one of the preambles transmitted during a recent successful random access process. The information indicating the number of preambles transmitted during the recent successful random access process may be numberOf- PreamblesSent, and may coincide with PREAMBLE_TRANSMISSION_COUNTER. Information indicating whether contention has occurred in at least one of the preambles transmitted during the recent successful random access process may be contentionDetected.

Figure 2C:
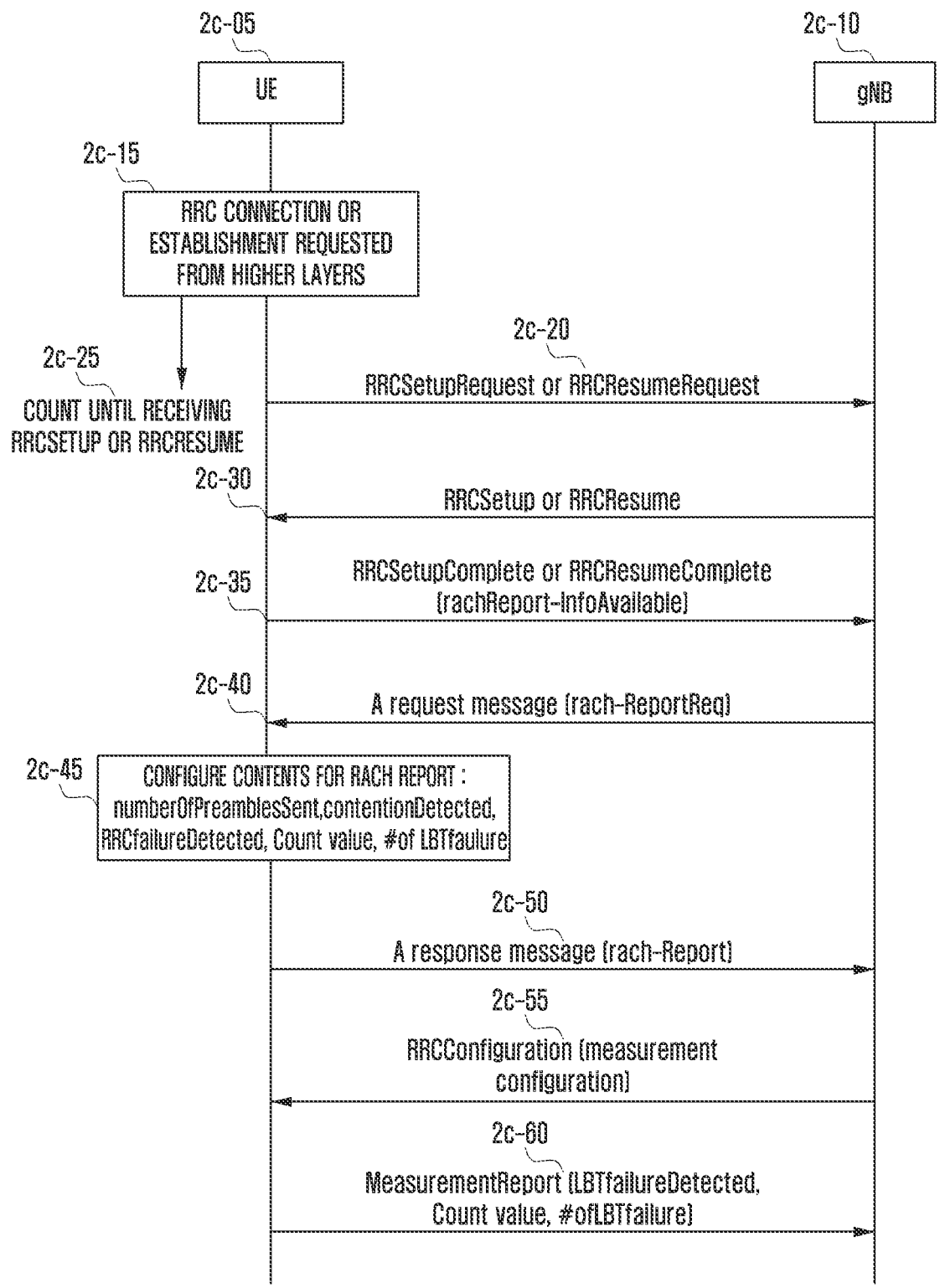
FIG. 2C is a flowchart of a process of reporting channel congestion information in the disclosure.

FIG. 2C is a flowchart of a process of reporting channel congestion information in the disclosure.

In a next-generation mobile communication system operating in an unlicensed frequency band, it is necessary to determine how much competition is occurring with a wireless system in which the frequency is being used or a mobile communication system operated by another service provider. If, in the case of a frequency in which intense competition occurs with other systems or systems of other operators, it is necessary to instruct to reselect a cell in a different frequency for a standby mode (RRC_Idle) or inactive mode (RRC_Inactive) terminal camping on that frequency. A terminal in a connected mode state at a corresponding frequency needs to perform inter-frequency handover at a different frequency.

In the disclosure, it is proposed that the terminal reports predetermined information so that it is possible to grasp the degree of competition between the base station and the mobile communication system operated by another wireless system or other operators with an unlicensed frequency being used. To this end, the terminals that have switched from the standby mode or the inactive mode to the connected mode may collect related information on how much contention has occurred in the switching process, and report the same to the base station. At this time, the RACH report process may be reused, and a separate reporting process from the RACH Report may be defined. In addition, the base station may set reporting of information related to the contention to connected mode terminals.

The terminal in the standby mode or inactive mode receives an RRC connection request from the terminal NAS or RRC (2c-15). The terminal initiates a random access process to switch to the connected mode. The terminal may transmit a message during a random access process (2c-20). The message may be msg3, and an RRCSetupRequest or RRCResumeRequest may be transmitted to msg3. In response, a message is received from the base station (2c-30). The message may be an RRC message, and specifically, may be an RRCSetup or RRCResume. Upon successfully receiving the RRC message, it is assumed that the terminal has switched to the connected mode.

The terminal may transmit another message as a response message to the received message. The message may be an RRC message, and specifically, may be RRCSetupComplete or RRCResumeComplete. The terminal may collect and store information related to LBT failure and channel occupation until the RRC connection is initialized and the connection mode is switched. For example, the information related to the LBT failure and channel occupancy may include at least one of the time taken to switch to the connected mode (i.e., until it successfully receives the RRCSetup or RRCResume message) (2c-25) after the terminal in the standby mode or inactive mode receives an RRC connection request from the terminal NAS or RRC, whether LBT is detected during the time or during the random access process, and the number of LBT failures during the time period or during the random access process. The information related to the LBT failure and channel occupancy may be used to cause the base station to reselect another frequency for a standby mode or inactive mode terminal camping on the base station, or to perform an inter-frequency handover on a connected mode terminal. For example, after a terminal in standby mode or inactive mode receives an RRC connection request from the terminal NAS or RRC, if the time required to switch to the connected mode (i.e., until the RRCSetup or RRCResume message is successfully received) is longer than the predetermined delay requirement, the base station may set frequency reselection or inter-frequency handover.

The message transmitted by the terminal may include a new indicator indicating that the terminal stores the information (2c-35). The base station receiving the RRC message including the indicator may request the terminal to report the stored information (2c-40). To this end, the request indicator may be included in an RRC message for a predetermined request purpose and transmitted to the terminal. Upon receiving the RRC message, the terminal may configure the stored information (2c-45), receive the information in an RRC message for a predetermined report purpose, and transmit the information to the base station (2c-50).

As an optimization to reduce signaling overhead, if the measured values are not greater than a predetermined threshold, the terminal may not report this to the base station. That is, if there is information stored but each measured value is not greater than a predetermined threshold, the indicator may not be included in the RRC message. The predetermined threshold may be set as system information or may be predefined.

The base station may also request the information from the connection mode terminal. The base station may include an indicator requesting the information in the measurement configuration (2c-55). Upon receiving the RRCReconfiguration including the indicator, the connected mode terminal collects and stores information related to LBT failure and channel occupation according to a predetermined rule. The terminal may report the collected result to the base station on a periodic or event basis according to the configuration (2c-60).

Information related to LBT failure or channel occupancy may be stored in a report triggered according to an existing report event (e.g., Event A1, Event A2, Event A3 . . . ). The report may be a measurementReport. On the other hand, it is possible to define a measurement report condition triggered based on information related to LBT failure or channel occupancy. As an example, the base station may configure the terminal to report the measurement information when corresponding to at least one of when the LBT failure occurring for one uplink transmission is more than a set specific number of times, when the time required for successful transmission after receiving the initial scheduling information for one uplink transmission is greater than a set specific value, or when the LBT failure is detected for one uplink transmission.

The terminal, which has received measurement-related configuration information from the base station through an RRC message, may collect information related to LBT failure and channel occupation. The RRC message may be an RRC Reconfiguration message. For example, the terminal may collect whether an LBT failure has been detected in the last x hours, the number of LBT failures in the last x hours, the time required until the transmission is successful after receiving the initial scheduling information for the uplink transmission, information on the specific number of times the LBT failure occurred for the recent uplink transmission is set, terminal location information, etc.

The terminal may receive the latest valid measurement information in the measurementReport periodically or when the reporting event is satisfied and report it to the base station. The information related to the LBT failure and channel occupancy and cell measurement information stored in the existing measurement report (e.g., reference signal received power (RSRP) and reference signal received quality (RSRQ) of the serving cell and adjacent cells) may be stored in measurementReport together. If the LBT failure has not occurred during the set period, the information related to the LBT failure and channel occupation may not be stored in the reported measurementReport. As an optimization to reduce signaling overhead, if the measured values are not greater than a predetermined threshold, the terminal may not report this to the base station. That is, if there is information to be included in the measurementReport, but each measurement value is not greater than a predetermined threshold value, the information may not be included in the RRC message. The predetermined threshold may be set as system information or measurement configuration, or may be predefined.

Figure 2D:
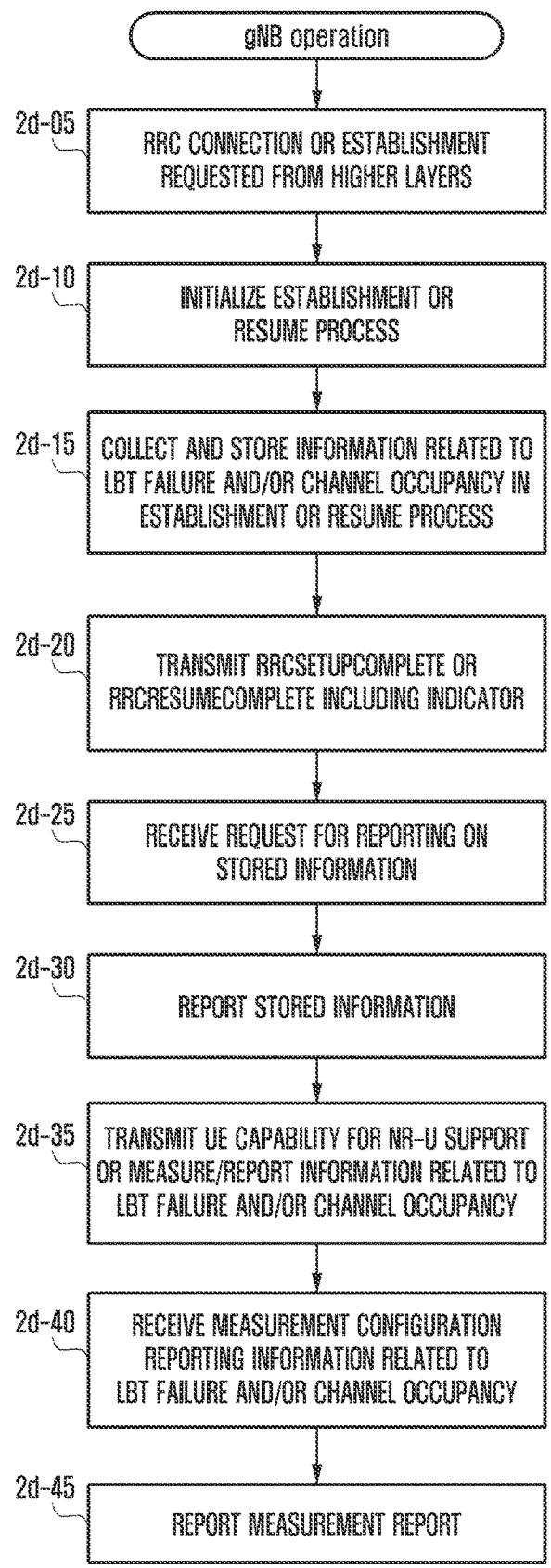
FIG. 2D is a flow chart of a terminal operation in the disclosure.

FIG. 2D is a flowchart of a terminal operation in the disclosure.

In step 2d-05, an RRC connection may be requested from the terminal NAS or RRC.

In step 2d-10, the terminal may initiate an establishment or resume process according to the current RRC state.

In step 2d-15, if the terminal supports the next-generation mobile communication system in the unlicensed frequency band, and the establishment or resume process is performed in the unlicensed frequency band, during the above process, information related to LBT failure or channel occupancy may be collected. The collected information has been described above. If the LBT failure does not occur at all, the related information may not be collected.

In step 2d-20, if the terminal collects and stores information related to the LBT failure or channel occupation, the RRC message may include an indicator indicating whether to store the information. The RRC message may be RRC-SetupComplete or RRCResumeComplete. The indicator indicating whether to be stored may be a 1-bit indicator. The RRC message may be transmitted to the base station.

In step 2d-25, the terminal may receive a predetermined RRC message including an indicator requesting report of the stored information from the base station.

In step 2d-30, the terminal may report the stored information to the base station by including it in a predetermined RRC message. When the RRC message is reported with another reporting, for example, a radio link failure (RLF) report, signaling radio bearer (SRB)1 may be applied. Otherwise, the LBT failure or channel occupancy related SRB2 may be applied when reporting only information or with minimization of drive tests (MDT) measurement information.

In steps 2d-35, the terminal may report to the base station whether the NR-U is supported in the connected mode and whether information related to the LBT failure or channel occupancy is supported.

In step 2d-40, the terminal may receive a measurement configuration from the base station. The configuration information may be received through an RRC message. The RRC message may be an RRCReconfiguration message. The measurement configuration may include an indicator requesting the reporting of information related to the LBT failure or channel occupation. Alternatively, it may be assumed that all terminals operating in NR-U are obligated to report along with other cell measurement information. In addition, in the measurement configuration, a new reporting condition, that is, an event may be defined. The new reporting event was described above.

In steps 2d-45, the terminal may report measurement information periodically or on an event basis. The information may include information related to the LBT failure or channel occupancy in addition to the existing cell measurement information.

Figure 2E:
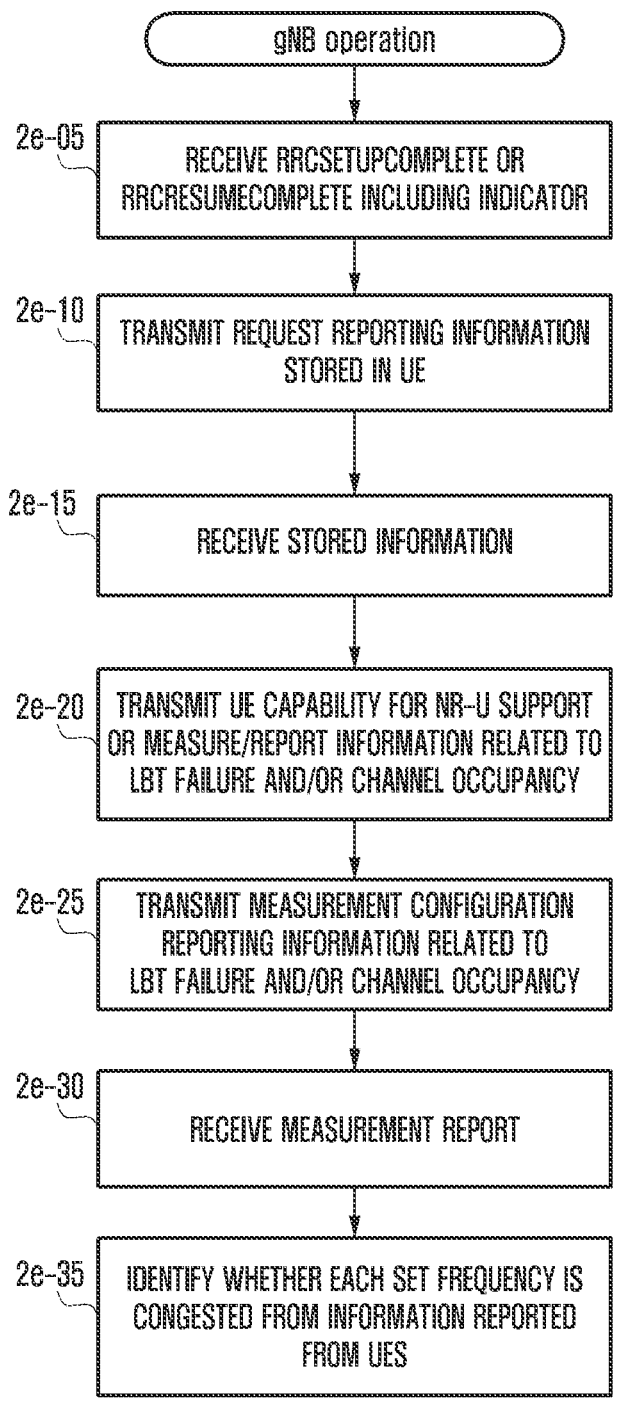
FIG. 2E is a flowchart of an operation of a base station of the disclosure.

FIG. 2E is a flowchart of a base station operation in the disclosure.

In step 2e-05, the base station may receive an RRC message including an indicator indicating whether to store information related to LBT failure or channel occupation from the terminal. The RRC message may be RRCSetupComplete or RRCResumeComplete. The indicator indicating whether information related to the LBT failure or channel occupation is stored may be a 1-bit indicator.

In step 2e-10, when the base station determines that the information is required, the base station may transmit a predetermined RRC message including an indicator requesting the information to be reported to the terminal.

In step 2e-15, the base station may receive the requested information from the terminal.

In step 2e-20, the base station may report whether NR-U is supported and whether the LBT failure or channel occupancy-related information is supported from the connection mode terminal.

In step 2e-25, if the terminal satisfies the support, the base station may provide a measurement configuration including an indicator requesting the terminal to report information related to the LBT failure or channel occupancy.

In step 2e-30, the base station may receive a measurementReport from the terminal. The RRC message may include information related to the LBT failure or channel occupation.

In step 2e-35, the base station may determine whether a specific unlicensed frequency band has a lot of competition with other systems or systems of other operators using information related to the LBT failure or channel occupation.

Figure 2F:
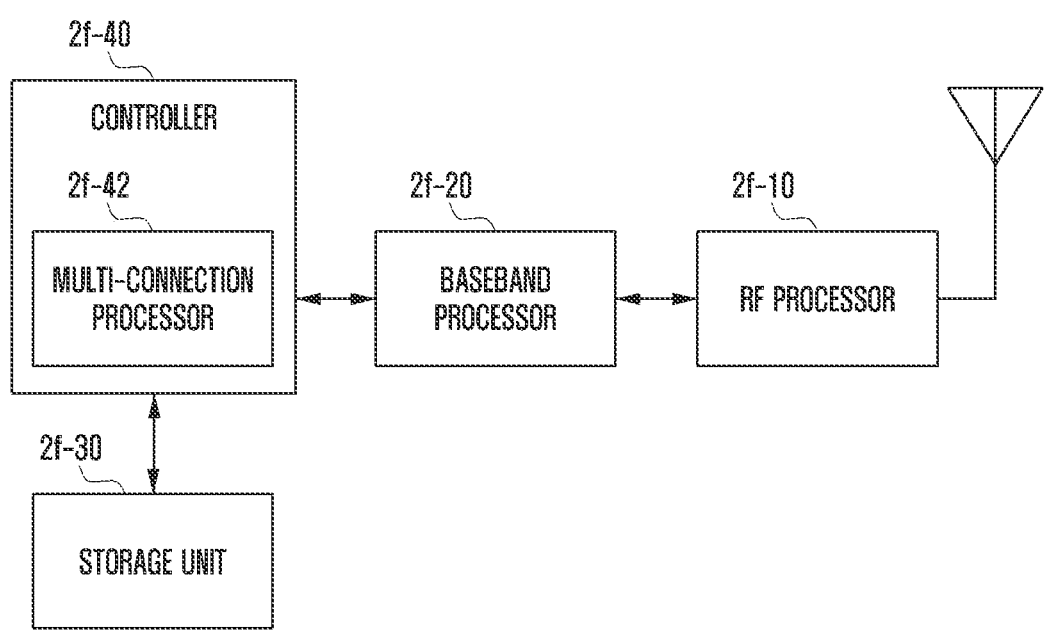
FIG. 2F is a block diagram illustrating an internal structure of a terminal to which the disclosure is applied.

FIG. 2F illustrates a structure of a terminal.

Referring to FIG. 2F, the terminal includes a radio frequency (RF) processor 2f-10, a baseband processor 2f-20, a storage unit 2f-30, and a controller 2f-40.

The RF processor 2f-10 may perform a function of transmitting and receiving a signal through a wireless channel such as band conversion and amplification of a signal. That is, the RF processor 2f-10 may up-convert the baseband signal provided from the baseband processor 2f-20 to an RF band signal and transmits it through an antenna, and down-convert the RF band signal received through the antenna to a baseband signal. For example, the RF processor 2f-10 may include a transmission filter, a reception filter, an amplifier, a mixer, an oscillator, a digital to analog convertor (DAC), and an analog to digital convertor (ADC). In FIG. 2F, only one antenna is shown, but the terminal may include a plurality of antennas.

In addition, the RF processor 2f-10 may include a plurality of RF chains. Furthermore, the RF processor 2f-10 may perform beamforming. For the beamforming, the RF processor 2f-10 may adjust a phase and a magnitude of each of signals transmitted/received through a plurality of antennas or antenna elements. Further, the RF processor 2f-10 may perform MIMO, and may receive multiple layers when performing the MIMO operation.

The baseband processor 2f-20 may perform a function of converting between a baseband signal and a bit stream according to a physical layer standard of a system. For example, when transmitting data, the baseband processor 2f-20 may generate complex symbols by encoding and modulating a transmission bit stream. In addition, when receiving data, the baseband processor 2f-20 may restore a received bit stream through demodulation and decoding of the baseband signal provided from the RF processor (2f-10). For example, in the case of the orthogonal frequency division multiplexing (OFDM) method, when transmitting data, the baseband processor 2f-20 may generate complex symbols by encoding and modulating a transmission bit stream, map the complex symbols to subcarriers, and configure OFDM symbols through an inverse fast Fourier transform (IFFT) operation and CP (cyclic prefix) insertion.

In addition, when receiving data, the baseband processor 2f-20 may divide the baseband signal provided from the RF processor 2f-20 in units of OFDM symbols, restore the signals mapped to the subcarriers through the fast Fourier transform (FFT) operation, and restore the received bit stream through demodulation and decoding.

The baseband processor 2f-20 and the RF processor 2f-10 may transmit and receive signals as described above. Accordingly, the baseband processor 2f-20 and the RF processor 2f-10 may be referred to as a transmission unit, a reception unit, a transmission/reception unit, or a communication unit. Furthermore, at least one of the baseband processor 2f-20 and the RF processor 2f-10 may include a plurality of communication modules to support a plurality of different wireless access technologies. For example, the different wireless access technologies may include a wireless LAN (e.g., IEEE 802.11), a cellular network (e.g., LTE), and the like. In addition, the different frequency bands may include a super high frequency (SHF) (e.g., 2.NRHz, NRhz) band, and a millimeter wave (e.g., 60 GHz) band.

The storage unit 2f-30 may store data such as a basic program, an application program, and setting information for the operation of the terminal. In particular, the storage unit 2f-30 may store information related to a second access node performing wireless communication using a second wireless access technology. In addition, the storage unit 2f-30 may provide stored data according to a request of the controller 2f-40.

The controller 2f-40 may control overall operations of the terminal. For example, the controller 2f-40 transmits and receives signals through the baseband processor 2f-20 and the RF processor 2f-10. In addition, the controller 2f-40 may write and read data in and from the storage unit 2f-40. To this end, the control unit 2f-40 may include at least one processor. For example, the controller 2f-40 may include a communication processor (CP) that controls communication and an application processor (AP) that controls higher layers such as an application program.

Figure 2G:
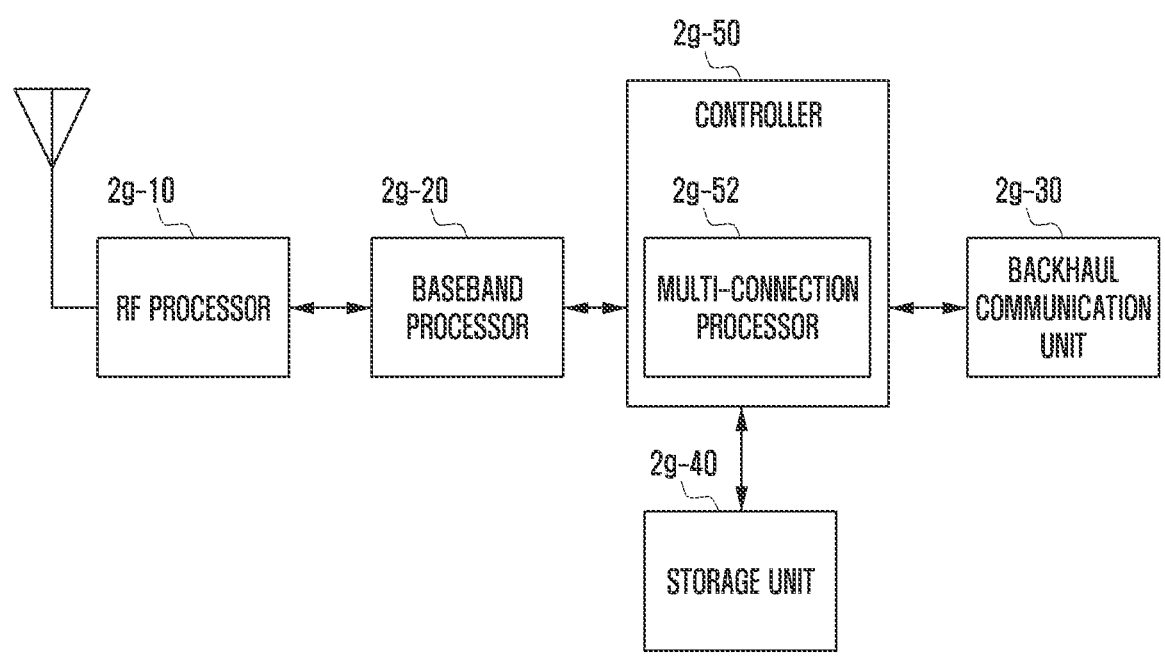
FIG. 2G is a block diagram illustrating a configuration of a base station according to the disclosure.

FIG. 2G illustrates a block configuration of a main station in a wireless communication system according to an embodiment.

As shown in FIG. 2G, the base station includes an RF processor 2g-10, a baseband processor 2g-20, a backhaul communication unit 2g-30, a storage unit 2g-40, and a processor 2g-50.

The RF processor 2g-10 may perform functions of transmitting and receiving a signal through a wireless channel such as band conversion and amplification of a signal. That is, the RF processor 2g-10 may up-convert the baseband signal provided from the baseband processor 2g-20 into an RF band signal and transmit the same through an antenna, and down-convert the RF band signal received through the antenna a baseband signal. For example, the RF processor 2g-10 may include a transmission filter, a reception filter, an amplifier, a mixer, an oscillator, a DAC, an ADC, and the like. In FIG. 2G, only one antenna is shown, but the first access node may include a plurality of antennas. In addition, the RF processor 2g-10 may include a plurality of RF chains.

Furthermore, the RF processor 2g-10 may perform beamforming. For the beamforming, the RF processor 2g-10 may adjust a phase and a magnitude of each of signals transmitted and received through a plurality of antennas or antenna elements. The RF processor 2g-10 may perform a downlink MIMO operation by transmitting one or more layers.

The baseband processor 2g-20 may perform a function of converting between a baseband signal and a bit stream according to a physical layer standard of the first wireless access technology. For example, when transmitting data, the baseband processor 2g-20 may generate complex symbols by encoding and modulating a transmission bit stream. In addition, when receiving data, the baseband processor 2g-20 may restore the received bit stream through demodulation and decoding of the baseband signal provided from the RF processor 2g-10. For example, in the case of the OFDM scheme, when transmitting data, the baseband processor 2g-20 may generate complex symbols by encoding and modulating a transmission bit stream, map the complex symbols to subcarriers, and configure OFDM symbols through the IFFT calculation and CP insertion.

In addition, when receiving data, the baseband processor 2g-20 may divide the baseband signal provided from the RF processor 2g-10 into units of OFDM symbols, restore signals mapped to subcarriers through the FFT operation, and restore the received bit stream through demodulation and decoding. The baseband processor 2g-20 and the RF processor 2g-10 may transmit or receive signals as described above. Accordingly, the baseband processor 2g-20 and the RF processor 2g-10 may be referred to as a transmitter, a receiver, a transceiver, a communication unit, or a wireless communication unit.

The backhaul communication unit 2g-30 may provide an interface for performing communication with other nodes in a network. That is, the backhaul communication unit 2g-30 may convert a bit stream transmitted from the main station to another node, for example, an auxiliary base station, a core network, etc., into a physical signal, and convert the physical signal received from the other node into a bit stream.

The storage unit 2g-40 may store data such as a basic program, an application program, and setting information for the operation of the main station. In particular, the storage unit 2g-40 may store information on bearers allocated to the connected terminal, measurement results reported from the connected terminal, and the like. In addition, the storage unit 2g-40 may store information that is a reference for determining whether to provide or stop providing multiple connections to the terminal. Further, the storage unit 2g-40 may provide stored data according to a request of the controller 2g-50.

The controller 2g-50 may control overall operations of the main station. For example, the controller 2g-50 may transmit and receive signals through the baseband controller 2g-20 and the RF controller 2g-10 or through the backhaul communication unit 2g-30. Also, the controller 2g-50 may write and read data in and from the storage unit 2g-40. To this end, the controller 2g-50 may include at least one processor.

The embodiments of the disclosure described and shown in the specification and the drawings have been presented to easily explain the technical contents of the disclosure and help understanding of the disclosure, and are not intended to limit the scope of the disclosure. That is, it will be apparent to those skilled in the art that other modifications and changes may be made thereto on the basis of the technical idea of the disclosure. Further, the above respective embodiments may be employed in combination, as necessary. For example, the embodiments of the disclosure may be partially combined to operate a base station and a terminal. Further, although the above embodiments have been described by way of the LTE/LTE-A system, other variants based on the technical idea of the embodiments may be implemented in other systems such as 5G and NR systems.

The invention claimed is:

1. A method performed by a terminal in a wireless communication system, the method comprising:
    storing information related to a listen-before-talk (LBT) failure and a channel occupancy for an unlicensed band;
    transmitting, to a base station, a first message, wherein the first message is a radio resource control (RRC) message including an indicator indicating that the information related to (the LBT) failure and the channel occupancy for the unlicensed band is stored;
    receiving, from the base station, a second message based on the first message, wherein the second message includes an indicator requesting a random access channel (RACH) report for the unlicensed band; and
    transmitting, to the base station, a third message including the RACH report for the unlicensed band,
    wherein the RACH report for the unlicensed band includes information indicating the LBT failure.

2. The method of claim 1, wherein the information indicating the LBT failure includes at least one of whether the LBT failure is detected during a random access process and a number of LBT failures.

3. A method performed by a base station in a wireless communication system, the method comprising:
    receiving, from a terminal, a first message, wherein the first message is a radio resource control (RRC) message including an indicator indicating that information related to a listen-before-talk (LBT) failure and a channel occupancy for an unlicensed band is stored, wherein the information related to the LBT failure and the channel occupancy for the unlicensed band is stored in the terminal;
    transmitting, from the base station, a second message based on the first message, wherein the second message includes an indicator requesting a random access channel (RACH) report for the unlicensed band; and
    receiving, from the terminal, a third message including the RACH report for the unlicensed band,
    wherein the RACH report for the unlicensed band includes information indicating the LBT failure.

4. The method of claim 3, wherein the information indicating the LBT failure includes at least one of whether the LBT failure is detected during a random access process and a number of LBT failures.

5. A terminal comprising:
    a transceiver configured to transmit or receive at least one signal; and
    a controller coupled to the transceiver,
    wherein the controller is configured to:
        store information related to a listen-before-talk (LBT) failure and a channel occupancy for an unlicensed band,
        transmit a first message to a base station, wherein the first message is a radio resource control (RRC) message including an indicator indicating that the information related to the LBT failure and the channel occupancy for the unlicensed band is stored,
        receive a second message from the base station, based on the first message, wherein the second message includes an indicator requesting a random access channel (RACH) report for the unlicensed band, and
        transmit a third message including RACH related information-the RACH report for the unlicensed band to the base station,
    wherein the RACH report for the unlicensed band includes information indicating the LBT failure.

6. The terminal of claim 5, wherein the information indicating the LBT failure includes at least one of whether the LBT failure is detected during a random access process and a number of LBT failures.

7. A base station comprising:
    a transceiver configured to transmit or receive at least one signal; and
    a controller coupled to the transceiver,
    wherein the controller is configured to:
        receive a first message from a terminal, wherein the first message is a radio resource control (RRC) message including an indicator indicating that information related to a listen-before-talk (LBT) failure and a channel occupancy is stored, wherein the information related to the LBT failure and the channel occupancy for an unlicensed band is stored in the terminal,
        transmit a second message from the base station, based on the first message, wherein the second message includes an indicator requesting a random access channel (RACH) report for an unlicensed band, and
        receive a third message including the RACH report for the unlicensed band from the terminal,
    wherein the RACH report for the unlicensed band includes information indicating the LBT failure.

8. The base station of claim 7, wherein the information indicating the LBT failure includes at least one of whether the LBT failure is detected during a random access process and a number of LBT failures.

* * * * *